US012568432B2

(12) United States Patent
Chiba et al.

(10) Patent No.: US 12,568,432 B2
(45) Date of Patent: Mar. 3, 2026

(54) USER EQUIPMENT (UE) AND COMMUNICATION CONTROL METHOD

(71) Applicant: SHARP KABUSHIKI KAISHA, Sakai City (JP)

(72) Inventors: Shuichiro Chiba, Sakai City (JP); Yasuo Sugawara, Sakai City (JP); Yudai Kawasaki, Sakai City (JP); Yoko Kuge, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 334 days.

(21) Appl. No.: 18/271,872

(22) PCT Filed: Jan. 14, 2022

(86) PCT No.: PCT/JP2022/001012
§ 371 (c)(1),
(2) Date: Jul. 12, 2023

(87) PCT Pub. No.: WO2022/154063
PCT Pub. Date: Jul. 21, 2022

(65) Prior Publication Data
US 2024/0073803 A1     Feb. 29, 2024

(30) Foreign Application Priority Data

Jan. 15, 2021    (JP) ................................. 2021-004784

(51) Int. Cl.
*H04W 48/18*        (2009.01)
*H04W 48/16*        (2009.01)
*H04W 84/04*        (2009.01)

(52) U.S. Cl.
CPC ........... *H04W 48/18* (2013.01); *H04W 48/16* (2013.01); *H04W 84/042* (2013.01)

(58) Field of Classification Search
CPC .............................. H04W 48/18; H04W 48/16
USPC ....................................... 455/432.1
See application file for complete search history.

(56) References Cited

U.S. PATENT DOCUMENTS

2022/0256493 A1*    8/2022   Kumar .................... H04L 69/40

OTHER PUBLICATIONS

3GPP TS 23.501 V16.7.0 (Dec. 2020) 3rd Generation Partnership Project; Technical Specification Group Services and System Aspects; System architecture for the 5G System (5GS); Stage 2 (Release 16).

(Continued)

*Primary Examiner* — Qutbuddin Ghulamali
(74) *Attorney, Agent, or Firm* — ScienBiziP, P.C.

(57)                    ABSTRACT

A unit is provided through an application of a disaster condition to a PLMN in 5GS, the unit being for transmitting and/or receiving a notification in a case that a communication service cannot be provided to a UE and for selecting a roaming destination PLMN by the UE. Provided are a procedure to allow the UE to recognize a state of a certain PLMN and transmit and/or receive information for appropriately selecting a PLMN as a moving destination in a case that a disaster condition applies or no longer applies to the certain PLMN, a method of selecting a PLMN based on information received and stored by the UE through a notification from the PLMN or the like, and a communication unit.

2 Claims, 7 Drawing Sheets

(56) References Cited

OTHER PUBLICATIONS

3GPP TS 23.502 V16.7.0 (Dec. 2020) 3rd Generation Partnership Project; Technical Specification Group Services and System Aspects; Procedures for the 5G System (5GS); Stage 2 (Release 16).

3GPP TS 24.501 V17.1.0 (Dec. 2020) 3rd Generation Partnership Project; Technical Specification Group Core Network and Terminals; Non-Access-Stratum (NAS) protocol for 5G System (5GS); Stage 3; (Release 17).

3GPP TS 23.122 V17.1.1 (Jan. 2021) 3rd Generation Partnership Project; Technical Specification Group Core Network and Terminals; Non-Access-Stratum (NAS) functions related to Mobile Station (MS) in idle mode (Release 17).

3GPP TR 24.811 V0.1.0 (Dec. 2020) 3rd Generation Partnership Project; Technical Specification Group Core Network and Terminals; Study on the support for minimization of service interruption; (Release 17).

Ericsson, "MINT: alternative 2 for How do other PLMNs indicate that they can accept "Disaster Inbound Roamers"?" C1-207327, 3GPP TSG-CT WG1 Meeting #126-e, Electronic meeting; Oct. 15-23, 2020.

\* cited by examiner

USER EQUIPMENT (UE) AND COMMUNICATION CONTROL METHOD

TECHNICAL FIELD

An aspect of the present invention relates to a user equipment (UE) and a communication control method. This application claims priority based on JP 2021-004784 filed on Jan. 15, 2021, the contents of which are incorporated herein by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

The 3GPP has recently studied next-generation communication technologies and system architectures for a 5th Generation (5G) mobile communication system which is a next generation mobile communication system, and in particular, has standardized a 5G System (5GS) as a system for realizing a 5G mobile communication system (see NPL 1 to NPL 4). In the 5GS, technical problems attributable to connection of various terminals to a cellular network are extracted to standardize solutions.

CITATION LIST

Non Patent Literature

NPL 1: 3GPP TS 23.501 V16.7.0 (2020-12); 3rd Generation Partnership Project; Technical Specification Group Services and System Aspects; System Architecture for the 5G System; Stage 2 (Release 16)

NPL 2: 3GPP TS 23.502 V16.7.0 (2020-12); 3rd Generation Partnership Project; Technical Specification Group Services and System Aspects; Procedures for the 5G System; Stage 2 (Release 16)

NPL 3: 3GPP TS 24.501 V17.1.0 (2020-12); 3rd Generation Partnership Project; Technical Specification Group Core Network and Terminals; Non-Access-Stratum (NAS) protocol for 5G System (5GS); Stage 3 (Release 17)

NPL 4: 3GPP TS 23.122 V17.1.1 (2021-01); 3rd Generation Partnership Project; Technical Specification Group Core Network and Terminals; Non-Access-Stratum (NAS) functions related to Mobile Station (MS) in idle mode (Release 17)

NPL 5: 3GPP TR 24.811 V0.1.0 (2020-12); 3rd Generation Partnership Project; Technical Specification Group Core Network and Terminals; Study on the support for minimization of service interruption; (Release 17)

SUMMARY OF INVENTION

Technical Problem

For the 5G System (5GS), in order to provide various services, a 5G Core Network (5GCN), which is a new core network, is under study.

Furthermore, the 3GPP has studied functions related to a core network and a user equipment (UE) in a case that a disaster condition applies to a public land mobile network (PLMN) which is a communication network providing a mobile communication service and services cannot be provided to the UE (see NPL 5).

However, details of a method of providing a notification to the UE or other PLMNs in a case of applying or no longer applying the disaster condition to a PLMN, a method of recognizing, by the UE, that the disaster condition applies or no longer applies to the PLMN, a method of selecting another PLMN by the UE after the UE recognizes that the PLMN to which the UE is connected is under the disaster condition have not been clarified.

An aspect of the present invention is made in view of the aforementioned circumstances and provides a method of providing a notification to a UE in a case of applying or no longer applying a disaster condition to a PLMN, and a method of selecting another PLMN by the UE that has received and recognized the notification.

Solution to Problem

A User Equipment (UE) according to an aspect of the present invention includes transmission and/or reception circuitry and a controller. The transmission and/or reception circuitry receives, through a registration procedure or a UE configuration update procedure, a list of one or more Public Land Mobile Networks (PLMNs) to usable in a disaster condition, and the controller performs PLMN selection for disaster roaming from the list. A communication control method according to an aspect of the present invention is performed by a User Equipment (UE) and includes receiving, through a registration procedure or a UE configuration update procedure, a list of one or more Public Land Mobile Networks (PLMNs) usable in a disaster condition; and performing PLMN selection for disaster roaming from the list.

Advantageous Effects of Invention

According to an aspect of the present invention, it is possible to provide a method of providing a notification to a UE in a case of applying or no longer applying a disaster condition to a PLMN and a method of selecting another PLMN by the UE that has received and recognized the notification.

DESCRIPTION OF EMBODIMENTS

A preferred embodiment for carrying out an aspect of the present invention will be described below with reference to the drawings. Note that, as an example, an embodiment of a mobile communication system to which an aspect of the present invention is applied will be described in the present embodiment.

1. Overview of System

Figure 1:
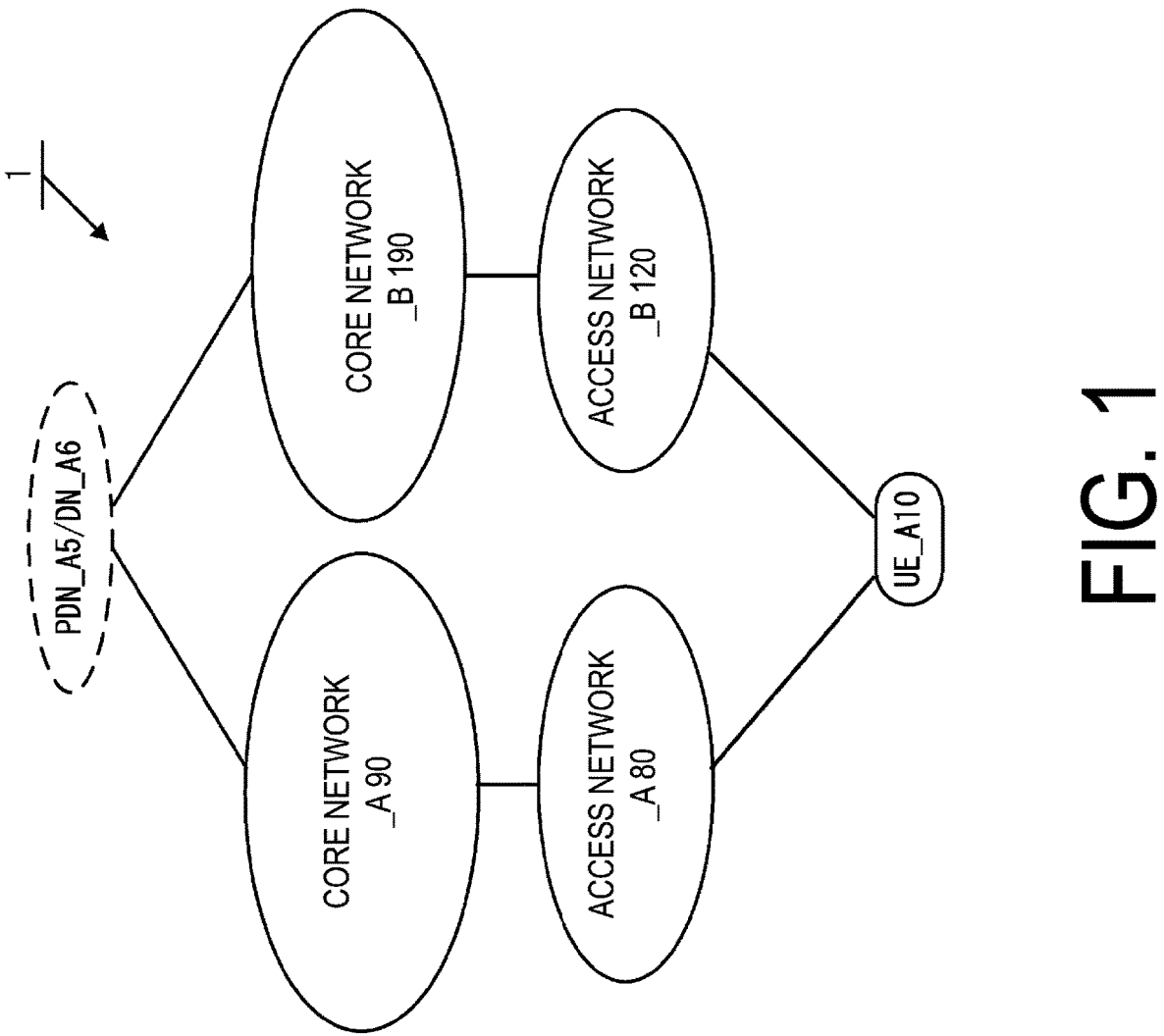
FIG. 1 is a diagram illustrating an overview of a mobile communication system (EPS/5GS).
Figure 2:
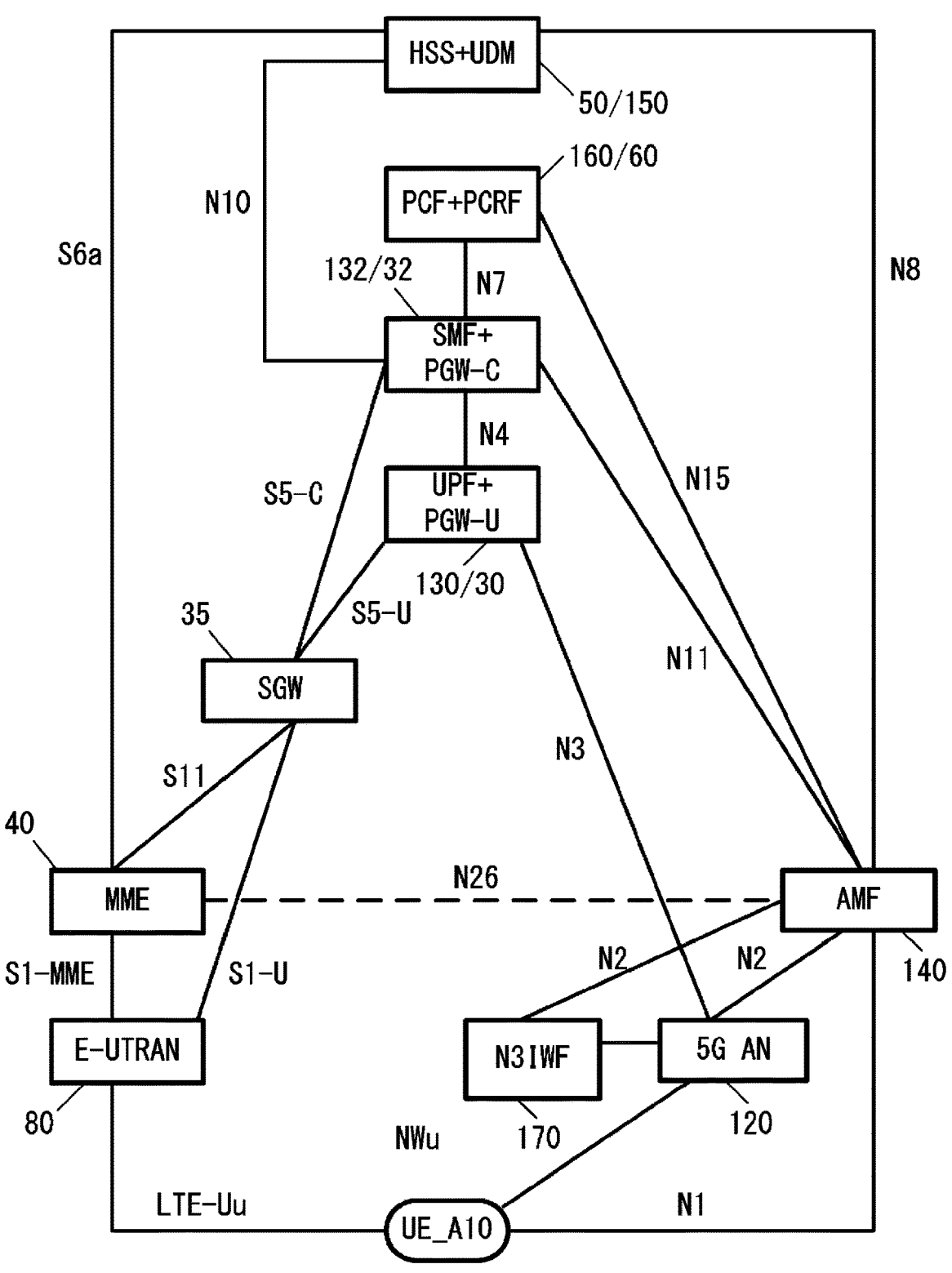
FIG. 2 is a diagram illustrating a detailed configuration of the mobile communication system (EPS/5GS).

First, FIG. 1 is a diagram for illustrating an overview of a mobile communication system 1 used in each embodiment, and FIG. 2 is a diagram for illustrating a detailed configuration of the mobile communication system 1.

FIG. 1 illustrates the mobile communication system 1 including a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR Node Bs (gNBs) 122 are deployed. Note that in the following description, the symbol for the gNB 122 may be omitted, such as in an eNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or a trusted non-3GPP access network. Here, the untrusted non-3GPP access network may be a non-3GPP access network, such as a public wireless LAN, without security management performed in the access network, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator (MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

The core network (the core network_A and/or the core network_B) and the access network (access network_A and/or the access network_B) may differ for each mobile communication operator.

FIG. 1 illustrates a case that the PDN and the DN are the same; however, the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. Each IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

Apparatuses which are not illustrated in FIG. 2 may be included in the access network_A, the core network_A, the access network_B, the core network_B, the PDN_A, and the DN_A. For example, the core network_A and/or the core network_B and/or PDN_A and/or DN_A may include an Authentication Server Function (AUSF) and an Authentication, authorization, and accounting (AAA) server (AAA-S). The AAA server may be disposed outside the core network.

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, approval, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a 3rd party.

Note that, although each of the apparatuses and functions is illustrated one by one for simplicity in FIG. 2, multiple similar apparatuses and functions may be included in the mobile communication system 1. Specifically, multiple apparatuses and functions such as the UE_As 10, the E-UTRANs 80, the MMEs 40, the SGWs 35, the PGW-Us 30, the PGW-Cs 32, the PCRFs 60, the HSSs 50, the 5G ANs 120, the AMFs 140, the UPFs 130, the SMFs 132, the PCFs 160, and/or the UDMs 150 may be included in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
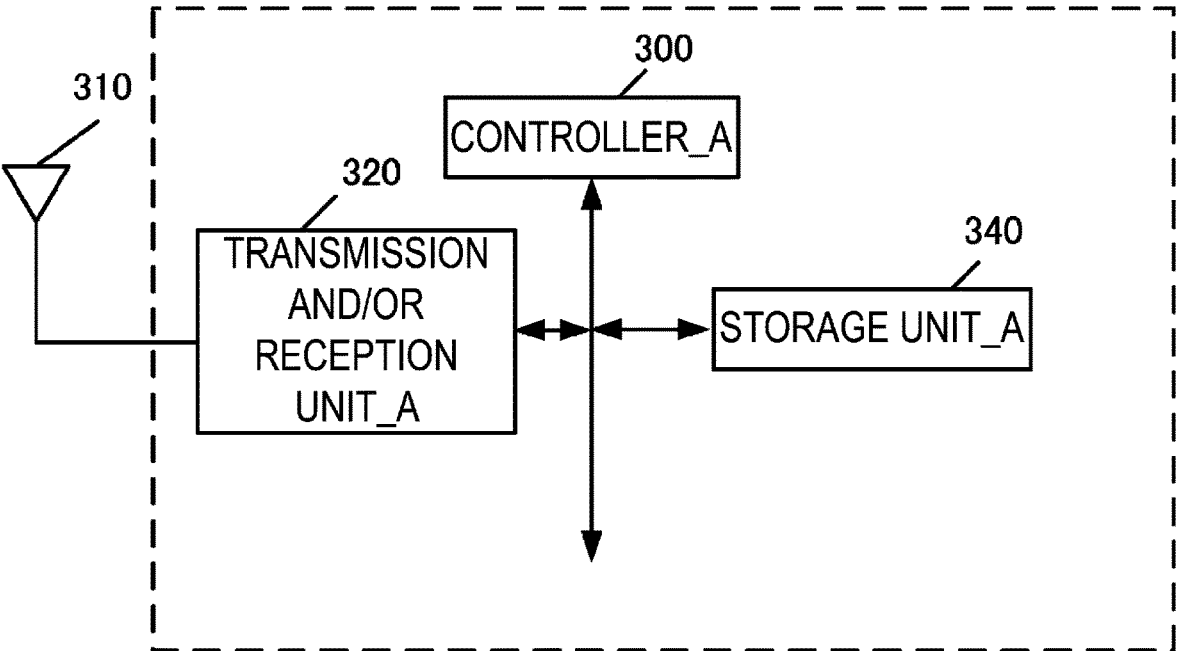
FIG. 3 is a diagram illustrating an apparatus configuration of a UE.

First, an apparatus configuration example of the user equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

2.2. Apparatus Configuration of gNB

Figure 4:
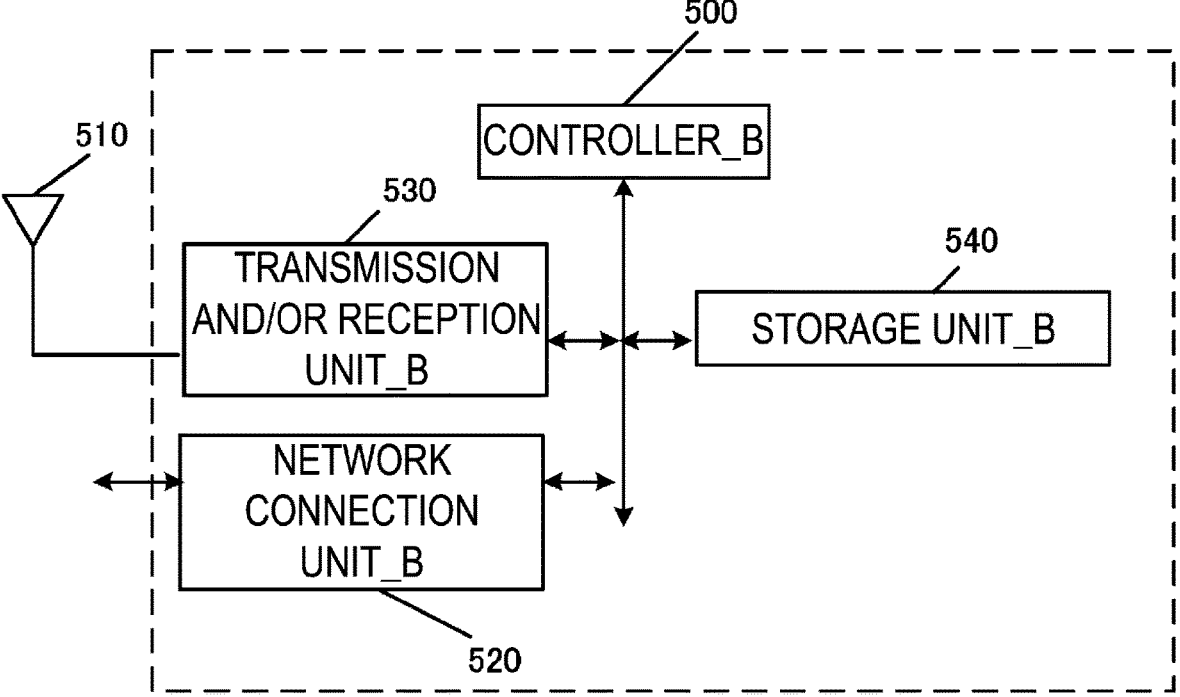
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
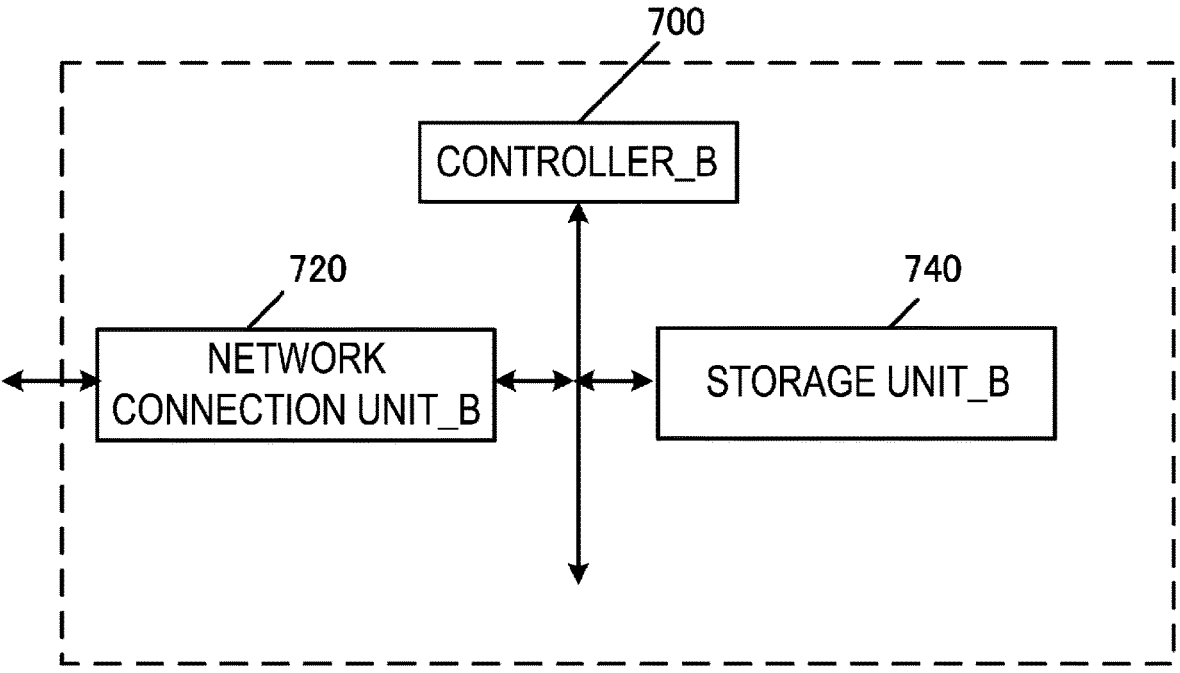
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB) in the 5G AN, and/or the SMF, and/or the PCF, and/or the UDM, and/or the SCEF. In other words, with the use of the network connection unit_B 720, the AMF can transmit and/or receive user data and/or control information to and/or from the base station apparatus (gNB) in the 5G AN, and/or the SMF, and/or the PCF, and/or the UDM, and/or the SCEF.

Following is a detailed description with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is in 5GMM-REGISTERED, the UE_A 10 may start transmission and/or reception of user data and a control message, or may respond to paging. In addition, note that, in a case that each apparatus is in 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is in 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) nor connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus and/or a function deployed between non-3GPP access and the 5GCN.

2.4. Apparatus Configuration of SMF

Next, an apparatus configuration example of the SMF 132 will be described by using FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB) in the 5G AN, and/or the SMF, and/or the DN. In other words, with the use of the network connection unit_B 720, the UPF can transmit and/or receive user data and/or control information to and/or from the base station apparatus (gNB) in the 5G AN, and/or the SMF, and/or the DN.

Following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, Control Plane (C-Plane (CP)) may be a communication path for transmitting and/or receiving a control message, and may include multiple bearers.

2.6. Description of Terms in Present Embodiment

Next, other apparatuses and/or functions and/or terms and/or identification information transmitted and/or received, stored, and managed by each apparatus and/or messages will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240.

Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like. The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW.

A Mobility management (MM) message (also referred to as a NAS MM message) may be a NAS message used in a procedure for MM, or may be a control message transmitted and/or received between the UE_A 10 and the AMF_A 240. Furthermore, the MM message may include a Registration request message, a Registration Accept message, a Registration reject message, a De-registration request message, a De-registration accept message, a configuration update command message, a configuration update complete message, a Service request message, a Service accept message, a Service reject message, a Notification message, a Notification response message, and the like. The procedure for MM or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

There are two access types, namely a 3GPP access and a non-3GPP access. Here, it is only necessary for information indicating an access type to be configured as an access type information element (IE), and for example, the information may be identification information indicating an access type to be used in signaling or user data transmission and reception between the UE and the core network.

An access technology means the type of a wireless access technology of the 3GPP access and includes NG-RAN, E-UTRAN, UTRAN, GERAN, or the like. The access technology is also referred to as an access technology. Note that the access technology may be identified by access network identification information (access technology identifier). Furthermore, the access network identification information may be information by which it is possible to identify the access technology and an operation mode of the access technology.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using the PDU session.

Note that each apparatus (the UE, and/or the access network apparatus, and/or the core network apparatus) may associate one or more pieces of identification information with a PDU session for management. Note that these pieces of identification information may include one or more of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network_B190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a (mobile) network operator, and the operator can be identified by a PLMN ID. In the present document, the PLMN may mean the PLMN ID. A PLMN that matches a Mobile Network Code (MNC) and a Mobile Country Code (MCC) of an International Mobile Subscriber Identity (IMSI) of the UE may be a Home PLMN (HPLMN). A visiting destination PLMN (Visited PLMN; VPLMN) may be a PLMN that is different from a home equivalent PLMN (HPLMN or HEPLMN). The PLMN may mean a core network.

Moreover, the UE may hold, in a Universal Subscriber Identity Module (USIM), an Equivalent HPLMN list for identifying one or more Equivalent HPLMNs (EHPLMNs). The HPLMN and/or a PLMN that is different from the EHPLMN may be a Visited PLMN (VPLMN or vPLMN).

The PLMN that the UE has successfully registered may be a Registered PLMN (RPLMN). Each apparatus may receive and/or hold and/or store, from the RPLMN, an Equivalent PLMN list for identifying one or multiple Equivalent PLMNs (EPLMNs) that can be used equivalently to the RPLMN in the PLMN selection performed by the UE.

The current PLMN may be a PLMN requested by the UE and/or a PLMN selected by the UE and/or the RPLMN and/or the PLMN allowed by the network and/or the PLMN to which the core network apparatus transmitting and/or receiving messages belongs to.

The requested PLMN means a message transmission destination network in a case that the UE transmits a message. Specifically, the requested PLMN may be a PLMN selected by the UE in a case that the UE transmits a message. The requested PLMN may be a current PLMN requested by the UE. Also, the requested PLMN may be a registered PLMN in a case that the UE is in a registration state.

A Steering of Roaming (SOR) transparent container information element (SOR transparent container IE) may include information for the HPLMN and/or the VPLMN to indicate an optimal roaming destination network for the roaming UE. Specifically, the SOR transparent container information element may include a list of preferred PLMN/access technology combinations.

In regard to the SOR transparent container information element and/or the list of preferred PLMN/access technology combinations, the PLMN (HPLMN) may be included in a "Secured packet" encrypted by a security function and may be referred to as a "Secured packet" in some cases.

Note that a Steering of Roaming application function (SOR-AF) which is one of entities in the core network may provide information including the list of preferred PLMN/access technology combinations in the UDM, and the AMF may be referred to information including the list of preferred PLMN/access technology combinations provided by the UDM, generates the SOR transparent container information element based on the information, and transmit it to the UE.

Here, the list of preferred PLMN/access technology combinations may be a list including combinations of preferred PLMNs (PLMNs) and access technologies, and the combinations may be aligned in order of priority.

Also, for example, in the PLMN selection in an automatic mode performed in a case that the UE switches networks with mobility or in a case that a power source is turned on at the roaming destination, the highest priority and available and allowable combination of a PLMN and an access technology may be selected.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be mapped. Here, the NF is a processing function in a network, and is adopted or defined in 3GPP. The NSI is an entity of one or more NSs configured in the core network_B. The NSI may include a virtual Network Function (NF) generated using a Network Slice Template (NST).

Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. Each NF configured in the NS may or may not be an apparatus shared with another NS.

The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF 132 and the UPF based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST.

The S-NSSAI may be information unique to each PLMN or may be standard information common to the PLMNs. The network may store one or more pieces of S-NSSAI in the registration information of the UE as default S-NSSAI. Note that, in a case that the S-NSSAI is a default S-NSSAI, and the UE does not transmit, to a network, a valid S-NSSAI in a registration request message, the network may provide an NS related to the UE.

Also, the S-NSSAI transmitted and/or received between the UE and the NW may be referred to as an S-NSSAI information element (IE). Furthermore, the S-NSSAI IE transmitted and/or received between the UE and the NW may include the S-NSSAI including the SST and/or the SD of the registered PLMN and/or the SST and/or the SD indicating the S-NSSAI of the HPLMN with the S-NSSAI mapped therein. One or multiple pieces of S-NSSAI stored in the UE and/or the NW may include the SST and/or the SD, or include the S-NSSAI including the SST and/or the SD and/or the SST and/or the SD indicating the S-NSSAI of the HPLMN with the S-NSSAI mapped therein.

The Network Slice Selection Assistance Information (NSSAI) is a set of pieces of the S-NSSAI. Each piece of the S-NSSAI included in the NSSAI is information for assisting the access network or the core network to select the NSI. The UE may store the NSSAI allowed by the network for each PLMN. The NSSAI may be information used for selecting the AMF. The UE may apply, to the PLMN and the EPLMN, each piece of NSSAI (allowed NSSAI and/or configured NSSAI and/or rejected NSSAI and or pending NSSAI and/or first NSSAI).

The mapped S-NSSAI is the S-NSSAI of the HPLMN mapped to the S-NSSAI of the registered PLMN in a roaming scenario. The UE may store one or multiple pieces of mapped S-NSSAI mapped to the S-NSSAI included in the configured NSSAI and the allowed NSSAI of each access type. Furthermore, the UE may store one or multiple pieces of mapped S-NSSAI of the S-NSSAI included in the first NSSAI and/or the rejected NSSAI and/or the pending NSSAI.

A Network Slice-Specific Authentication and Authorization (NSSAA) function is a function for implementing network slice specific authentication and authorization. The network slice-specific authentication and authorization allows the UE to be authenticated and authorized outside the core network, such as in a 3rd Party. The PLMN and the network apparatus having the NSSAA function can perform an NSSAA procedure for a certain S-NSSAI, based on registration information of the UE. Furthermore, the UE including the NSSAA function can manage, store, and transmit and/or receive the pending NSSAI and the third rejected NSSAI. In the present document, NSSAA may be referred to as a network slice specific authentication and authorization procedure or an authentication and authorization procedure.

The S-NSSAI that requires NSSAA is an S-NSSAI that requires NSSAA managed by the core network and/or the core network apparatus. Furthermore, the S-NSSAI requiring the NSSAA may be S-NSSAI other than that of the HPLMN, which is managed by the core network and/or the core network apparatus, and in which the S-NSSAI requiring the NSSAA is the mapped S-NSSAI.

The core network and/or the core network apparatus may store the S-NSSAI that requires NSSAA by associating the S-NSSAI and information indicating whether or not NSSAA is required. In addition, the core network and/or the core network apparatus may store by associating the S-NSSAI that requires NSSAA and information indicating whether or not NSSAA has completed or information indicating NSSAA has completed and the state is an allowed or success state. The core network and/or the core network apparatus may manage the S-NSSAI that requires NSSAA as information unrelated to the access network.

Configured NSSAI is NSSAI fed and stored in the UE. The UE may store the configured NSSAI for each PLMN. The UE may store the configured NSSAI in association with the PLMN. Note that in the present document, the configured NSSAI associated with the PLMN may be referred to as configured NSSAI with respect to the PLMN, configured NSSAI of the PLMN, configured NSSAI for the PLMN, or configured NSSAI associated with the PLMN. The UE may store configured NSSAI that is not associated with the PLMN and is valid for all the PLMNs, and such configured NSSAI may be defined as "default configured NSSAI".

The configured NSSAI may be associated with multiple PLMNs, and these multiple PLMNs may be EPLMNs.

The configured NSSAI may be information configured by the network (or PLMN). The S-NSSAI included in the configured NSSAI may be referred to as configured S-NS-SAI. The configured S-NSSAI may include S-NSSAI and mapped S-NSSAI. Alternatively, the S-NSSAI of the PLMN may be referred to as "configured S-NSSAI", and the S-NSSAI with the configured S-NSSAI mapped to the HPLMN may be referred to as "mapped S-NSSAI with respect to configured NSSAI for the PLMN".

Requested NSSAI is NSSAI provided to the network from the UE during the registration procedure. In the registration procedure, the S-NSSAI included in the requested NSSAI transmitted by the UE may be S-NSSAI included in the allowed NSSAI or the configured NSSAI stored in the UE. In the PDU session establishment procedure, the S-NSSAI included in the requested NSSAI transmitted by the UE may be S-NSSAI included in the allowed NSSAI stored in the UE.

The requested NSSAI may be information indicating a network slice requested by the UE. The S-NSSAI included in the requested NSSAI may be referred to as requested S-NSSAI. For example, the requested NSSAI is included, for transmission, in a Non-Access-Stratum (NAS) message transmitted from the UE to the network, such as a registration request message or a PDU session establishment request message, or in a Radio Resource Control (RRC) message including the NAS message.

The allowed NSSAI is information indicating one or multiple network slices allowed for the UE. In other words, the allowed NSSAI is information identifying a network slice to which the UE is allowed by the network to connect.

The UE and/or the NW may store and manage the allowed NSSAI for each access (the 3GPP access or the non-3GPP access), as information regarding the UE. The UE and/or the NW may further manage the allowed NSSAI in association with the registration area.

Furthermore, the UE and/or the NW may store and manage the allowed NSSAI in association with the PLMN, as information regarding UE. The allowed NSSAI may be associated with multiple PLMNs, and these multiple PLMNs may be EPLMNs.

Note that in the present document, the allowed NSSAI associated with the PLMN and the access type may be referred to as allowed NSSAI with respect to the PLMN and the access type or allowed NSSAI with respect to the access type of the PLMN. The S-NSSAI included in the allowed NSSAI may be referred to as an allowed S-NSSAI. The allowed S-NSSAI may include S-NSSAI and mapped S-NS-SAI.

Rejected NSSAI is information indicating one or multiple network slices not allowed for the UE. In other words, the rejected NSSAI is information identifying a network slice to which the UE is not allowed by the network to connect. The rejected NSSAI may be information including one or multiple combinations of S-NSSAI and a reject cause value.

Here, the reject cause value is information indicating why the network rejects the corresponding S-NSSAI. The UE and the network may each appropriately store and manage the rejected NSSAI based on the reject cause value associated with each piece of S-NSSAI.

Furthermore, the rejected NSSAI may be included in the NAS message transmitted from the network to the UE, such as the registration accept message, the configuration update command, or the registration reject message, or in the RRC message including the NAS message. The S-NSSAI included in the rejected NSSAI may be referred to as a rejected S-NSSAI.

The rejected NSSAI may be any of the first to third rejected NSSAI, the pending NSSAI, and the first NSSAI, or a combination thereof. The S-NSSAI included in the rejected NSSAI may be referred to as a rejected S-NSSAI. The rejected S-NSSAI may include the S-NSSAI and the mapped S-NSSAI.

The UE and/or the NW may store and manage the rejected NSSAI in association with the PLMN, as information regarding the UE. The rejected NSSAI may be associated with multiple PLMNs, and these multiple PLMNs may be EPLMNs.

Note that in the present document, the rejected NSSAI associated with the PLMN may be referred to as rejected NSSAI with respect to the PLMN or rejected NSSAI of the PLMN. The UE and/or the NW may further store second rejected NSSAI and/or second rejected S-NSSAI in association with the registration area. The UE and/or the NW may store the second rejected NSSAI and/or the second rejected S-NSSAI in association with the access type and/or the registration area.

Here, the first rejected NSSAI is a set of one or more pieces of the S-NSSAI included in the requested NSSAI by the UE, the one or more pieces of S-NSSAI being not available in the current PLMN. The first rejected NSSAI may be rejected NSSAI for the current PLMN in the 5GS, may be rejected S-NSSAI for the current PLMN, or may be S-NSSAI included in the rejected NSSAI for the current PLMN. The first rejected NSSAI may be rejected NSSAI stored by the UE or the NW, or may be rejected NSSAI transmitted from the NW to the UE. In a case that the first rejected NSSAI is rejected NSSAI transmitted from the NW to the UE, the first rejected NSSAI may be information including one or multiple combinations of S-NSSAI and a cause value. The reject cause value at this time may be "S-NSSAI not available in the current PLMN or SNPN" or may be information indicating that the S-NSSAI associated with the reject cause value is not available in the current PLMN or SNPN. The S-NSSAI included in the first rejected NSSAI may be referred to as first rejected S-NSSAI.

The first rejected NSSAI may be applied to the entire registered PLMNs. The UE and/or NW may handle the S-NSSAI included in the first rejected NSSAI and the first rejected NSSAI as information not dependent on the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, the UE deletes the first rejected NSSAI in a case that the UE transitions to the deregistered state for the current PLMN via one certain access, or in a case that the UE successfully registers with a new PLMN via one certain access, or in a case that the UE fails to register with a new PLMN via one certain access and transitions to the deregistered state, and further that the UE is not regis-tered (deregistered state) via the other access. In other words, in a case that the UE transitions to a deregistered state with respect to the current PLMN via a certain access and the UE is registered (registered state) in the current PLMN via the other access, the UE need not delete the first rejected NSSAI.

The second rejected NSSAI is a set of one or multiple pieces of the S-NSSAI included in the requested NSSAI by the UE, the one or multiple pieces of NSSAI being not available in the current registration area. The second rejected NSSAI may be rejected NSSAI for the current registration area in the 5GS. The second rejected NSSAI may be rejected NSSAI stored by the UE or the NW, or may be rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The reject cause value at this time may be "S-NSSAI not available in the current registration area" or may be information indicating that the S-NSSAI associated with the cause value is not available in the current registration area. The S-NSSAI included in the second rejected NSSAI may be referred to as second rejected S-NSSAI.

The second rejected NSSAI may be valid within the current registration area and may be applied to the current registration area. The UE and/or the NW may handle the second rejected NSSAI and the S-NSSAI included in the second rejected NSSAI as information for each access type. In other words, the second rejected NSSAI may be valid information for each of the 3GPP access or the non-3GPP access. In other words, once the UE transitions to the deregistered state with respect to a certain access, the UE may delete the second rejected NSSAI associated with the access from the storage.

The third rejected NSSAI is S-NSSAI that requires NSSAA and is a set of one or multiple pieces of S-NSSAI for which the NSSAA for the S-NSSAI is failed or revoked. The third rejected NSSAI may be NSSAI stored by the UE and/or the NW or NSSAI transmitted and/or received between the NW and the UE. In a case that the third rejected NSSAI is transmitted from the NW to the UE, the third rejected NSSAI may be information including one or multiple combinations of S-NSSAI and a reject cause value. The reject cause value at this time may be "S-NSSAI not available due to the failed or revoked NSSAA" and may be information indicating that the NSSAA for the S-NSSAI associated with the reject cause value has been failed or revoked. The S-NSSAI included in the third rejected NSSAI may be referred to as third rejected S-NSSAI.

The third rejected NSSAI may be applied to the entire registered PLMNs, or may be applied to the registered PLMNs and/or EPLMNs, or may be applied to all the PLMNs. The fact that the third rejected NSSAI is applied to all the PLMNs may mean that the third rejected NSSAI is not associated with the PLMNs or may mean that the third rejected NSSAI is associated with the HPLMNs.

Furthermore, the UE and/or the NW may handle the third rejected NSSAI and the third rejected S-NSSAI as information not dependent on the access type. In other words, the third rejected NSSAI may be valid information for 3GPP access and non-3GPP access. The third rejected NSSAI may be NSSAI different from the rejected NSSAI. The third rejected NSSAI may be the first rejected NSSAI. The third rejected NSSAI may be rejected NSSAI for the failed or revoked NSSAA in the 5GS, or may be rejected S-NSSAI for the failed or revoked NSSAA, or may be S-NSSAI included in the rejected NSSAI for the failed or revoked NSSAA.

The third rejected NSSAI is rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple pieces of S-NSSAI received from the core network in association with the reject cause value indicating failure of NSSAA. The third rejected NSSAI is information not dependent on the access type. Specifically, in a case of storing the third rejected NSSAI, the UE need not attempt to transmit, either on 3GPP access or on non-3GPP access, the registration request message including the S-NSSAI included in the third rejected NSSAI. Alternatively, the UE can transmit, based on a UE policy, the registration request message including the S-NSSAI included in the third rejected NSSAI. Alternatively, the UE may delete the third rejected NSSAI based on the UE policy, and transition to a state in which the UE can transmit the registration request message including the S-NSSAI included in the third rejected NSSAI. In other words, in a case that the UE transmits, based on the UE policy, the registration request message including the S-NSSAI included in the third rejected NSSAI, the UE may delete the S-NSSAI from the third rejected NSSAI.

The first NSSAI is information including one or multiple pieces of S-NSSAI that have reached the maximum number of UEs for each network slice. The first NSSAI may be rejected NSSAI, may be allowed NSSAI, or may be pending NSSAI. The first NSSAI may be NSSAI stored by the UE and/or the NW, or NSSAI transmitted from the NW to the UE.

In a case that the first NSSAI is transmitted from the NW to the UE, the first NSSAI may be information including one or multiple pieces of information including at least one of the S-NSSAI and the mapped S-NSSAI, the reject cause value, the value of the back-off timer, and information indicating the valid range of the value of the back-off timer. The reject cause value at this time may be "S-NSSAI having reached the maximum number of UEs for each network slice" and may be information indicating that the maximum number of UEs that can be allowed for the S-NSSAI associated with the reject cause value has been reached. Here, the reject cause value may be a reject cause value included in the rejected NSSAI, may be flag information, or may be 5GMM cause. Furthermore, in this case, the value of the back-off timer may be information indicating the duration for which the UE is prohibited from transmitting the MM message and the SM message using the corresponding S-NSSAI or the S-NSSAI related to the mapped S-NSSAI.

Furthermore, the information indicating the valid range of the value of the back-off timer may be information indicating whether the value of the back-off timer is applied to the current Public Land Mobile Network (PLMN), or is applied to all the PLMNs, or is valid in the current registration area.

The first NSSAI may be applied to the entire registered PLMNs, may be valid for or applied to all the PLMNs, may be valid within the registration area, may be applied to the registered PLMNs and EPLMNs, or may be applied to one or multiple PLMNs to which TAI included in a TA list (a TAI list or a registration area) belongs to. The fact that the first NSSAI is applied to all the PLMNs may mean that the first NSSAI is not associated with the PLMNs or may mean that the first NSSAI is associated with the HPLMNs.

In a case that the first NSSAI is valid for the entire registered PLMNs, or is applied to all the PLMNs, or is applied to the registered PLMNs and/or EPLMNs, the UE and/or the NW may handle the first NSSAI and the S-NSSAI included in the first NSSAI as information not dependent on the access type. In a case that the first NSSAI is effective within the registration area or is applied to one or multiple PLMNs to which TAI included in the TA LIST (the TAI list or the registration area) belongs to, the UE and/or the NW may handle the first NSSAI and the S-NSSAI included in the first NSSAI as information for each access type.

The first NSSAI may be allowed NSSAI, rejected NSSAI, pending NSSAI, or information different from these types of information.

The pending NSSAI is a set of one or multiple pieces of S-NSSAI that are pending and/or unavailable for use by the UE. The pending NSSAI is the S-NSSAI for which the network requires network slice specific authentication and may be a set of S-NSSAI for which the network slice specific authentication has not been completed. The pending NSSAI may be pending NSSAI in the 5GS. The pending NSSAI may be NSSAI stored in the UE and/or the NW or may be NSSAI transmitted and/or received between the NW and the UE.

In a case that the pending NSSAI is NSSAI transmitted from the NW to the UE, the pending NSSAI may be information including one or multiple combinations of S-NSSAI and a reject cause value. The reject cause value at this time may be "NSSAA is pending for the S-NSSAI" or may be information indicating that the S-NSSAI associated with the reject cause value is forbidden or pending for use by the UE until the NSSAA for the S-NSSAI is completed.

In a case that the pending NSSAI is NSSAI transmitted from the NW to the UE, the pending NSSAI may be a set of combinations of S-NSSAI and mapped S-NSSAI.

The pending NSSAI may be applied to the entire registered PLMNs, may be applied to the registered PLMNs and one or multiple EPLMNs of the registered PLMNs, or may be applied to all the PLMNs. The fact that the pending NSSAI is applied to all the PLMNs may mean that the pending NSSAI is not associated with the PLMNs or may mean that the pending NSSAI is associated with the HPLMNs.

The UE and/or the NW may handle the S-NSSAI included in the pending NSSAI as information not dependent on the access type. In other words, the pending NSSAI may be information valid for 3GPP access and non-3GPP access. The pending NSSAI may be NSSAI different from the rejected NSSAI. The pending NSSAI may be first rejected NSSAI.

The pending NSSAI is NSSAI including one or multiple pieces of S-NSSAI identifying slices for which the UE is pending the procedure. Specifically, while storing the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NSSAI is information not dependent on the access type. Specifically, in a case of storing the pending NSSAI, the UE attempts to transmit, neither on 3GPP access nor on non-3GPP access, the registration request message including the S-NSSAI included in the pending NSSAI.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The Registration area is a set of one or multiple TAs allocated to the UE by the AMF. Note that while moving within one or multiple TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified by a TAI list configured by one or multiple TAIs.

The TAI included in the TAI list may belong to one PLMN or may belong to multiple PLMNs. In a case that multiple pieces of TAI included in the TAI list belong to different PLMNs, the PLMNs may be EPLMNs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

The disaster condition for the PLMN may be a condition in which the network (PLMN) cannot provide a communication service to the user due to occurrence of natural disaster or a human-induced error. Note that the disaster condition may be applied to the PLMN in a case that the disaster condition occurs, and the disaster condition may be applied to the entire PLMN or may be applied to a specific area or function in the PLMN.

Note that in the present document, the PLMN to which the disaster condition applies is also referred to as "PLMN D" and the PLMN that is not in the disaster condition is also referred to as "PLMN A".

The disaster roaming may mean that the UE registered or connected to the PLMN to which the disaster condition applies moves (roaming) to another network (PLMN) in order to continue using communication services. Note that the disaster roaming may be performed based on the application of the disaster condition to the network. The selection of the PLMN as a moving destination may be based on information received from the network and stored and managed by the UE.

A forbidden PLMN list or a list of "forbidden PLMN(s)" may be a list for managing the PLMNs for which connection (access) and/or registration is forbidden and may be a list including zero or more PLMN IDs. Here, the forbidden PLMN list may be a list that the UE manages inside the UE. More specifically, the UE may add a PLMN ID of the core network to the forbidden PLMN list based on reception of a registration reject message from the core network in a case that the UE performs the registration procedure.

In regard to the forbidden PLMN list, multiple lists may be managed for each access type inside the UE, and for example, two lists, namely a forbidden PLMN list for the 3GPP access and a forbidden PLMN list for the non-3GPP access may be managed.

The forbidden PLMN list may be stored and managed in a Universal Subscriber Identity Module (USIM), for example, inside the UE or the SIM.

Note that in a case that the UE does not store any valid PLMN ID except for the forbidden PLMN list in a case of performing the aforementioned disaster roaming, the registration procedure may be performed for the PLMN IDs included in the forbidden PLMN list. In this case, the registration request message may further include information indicating the disaster roaming.

Furthermore, the UE may manage a list for managing the PLMNs to which the disaster condition applies or no longer applies. In the present document, the list for managing the PLMNs to which the disaster condition applies or no longer applies is referred to as a forbidden PLMN list for the disaster condition.

Here, the forbidden PLMN list for the disaster condition may be configured as a list including zero or more PLMN IDs to which the disaster condition applies and that is notified to the UE by the network and/or recognized by the UE. More specifically, in a case that the UE receives identification information (third identification information which will be described later) indicating the PLMN ID to which the disaster condition applies, for example, the UE may add the PLMN ID indicated by the identification information to the forbidden PLMN list for the disaster condition. Conversely, in a case that the UE receives identification information (fourth identification information which will be described later) indicating the PLMN ID to which the disaster condition no longer applies, the PLMN ID indicated by the identification information may be deleted from the forbidden PLMN list of the disaster condition.

The forbidden PLMN list for the disaster condition may be a list for managing the PLMNs (PLMN IDs) for which connection (access) and/or registration is forbidden, similar to the aforementioned forbidden PLMN list, may include zero or more PLMN IDs and may be managed for each access type.

The aforementioned forbidden PLMN list and/or the PLMN list for the disaster condition may be deleted by turning on/off the power source or by inserting or pulling out the USIM.

Furthermore, the forbidden PLMN list for the disaster condition may be a list including one or multiple PLMN IDs. In other words, the forbidden PLMN list for the disaster condition may be a set including one or multiple PLMN IDs. Here, the PLMN IDs may be information for identifying the PLMNs to which the disaster condition applies. In other words, the PLMN IDs may be PLMN IDs of the PLMNs to which the disaster condition applies.

In addition, the forbidden PLMN list for the disaster condition may be a list for managing the PLMNs (PLMN IDs) for which connection (access) and/or registration is forbidden while the PLMNs are under the disaster condition. In other words, the forbidden PLMN list for the disaster condition may be a list for managing the PLMNs (PLMN IDs) for which connection (access) and/or registration is forbidden due to the disaster condition.

In addition, the forbidden PLMN list for the disaster condition may be a list managed by the UE. Moreover, the forbidden PLMN list for the disaster condition may be a list shared between the UE and the core network.

In addition, the UE may add the current PLMN to the forbidden PLMN list for the disaster condition in a case that the UE receives identification information (third identification information which will be described later) indicating that the disaster condition has been applied. More specifically, the UE may add the PLMN ID indicating the current PLMN to the forbidden PLMN list for the disaster condition in a case that the UE receives the identification information (third identification information which will be described later) indicating that the disaster condition has been applied.

Conversely, in a case that the UE receives identification information (fourth identification information which will be described later) indicating that the disaster condition no longer applies to PLMN_A, the ULE may delete the PLMN_A from the forbidden PLMN list in the disaster condition. More specifically, in a case that the UE receives the identification information (fourth identification information which will be described later) indicating that the disaster condition no longer applies to the PLMN_A, the UE may delete the PLMN ID indicating the PLMN_A from the forbidden PLMN list for the disaster condition. Here, the PLMN_A may be a PLMN that has previously been registered. In addition, the PLMN_A may be a home PLMN (HPLMN).

Note that there may be a "disaster roaming PLMN list" or a "disaster roaming PLMN and area list" as a list for managing PLMNs and/or specific areas in the PLMNs to which the disaster roaming applies in the network, and such a list may be provided to the UE. Furthermore, the UE receiving such a list may store and manage the list in the same manner as the aforementioned forbidden PLMN list for the disaster roaming. In the present document, the "disaster roaming PLMN list" or the "disaster roaming PLMN and area list" that is provided from the network, is stored in the UE, and is a target of management such as addition or deletion of the PLMN IDs or the area information may also be referred to as a forbidden PLMN list at the time of disaster roaming.

SOR is an abbreviation of Steering of Roaming and means a method and a technique by which the UE is promoted to roam the network as a prioritized roaming destination (or recommended roaming destination) indicated by the HPLMN.

Steering of roaming connected mode control information (SOR-CMCI) is HPLMN information for controlling a timing at which the UE transition from the 5GMM connection mode to the 5GMM non-connection mode to perform the SOR. The SOR-CMCI may be included in SOR information and/or SOR transparent container or may be transmitted and/or received by being included in another information element.

The SOR-CMCI may include criteria information and a first timer value. Furthermore, the criteria information and the first timer value may be associated with each other.

Here, the criteria information may include criteria belonging to a PDU session and/or criteria related to a service type and/or criteria belonging to all the types.

Furthermore, the criteria belonging to the PDU session may be criteria information for identifying the corresponding PDU session. Specifically, the criteria belonging to the PDU session may be criteria information including one or more of the S-NSSAI_A, the DNN_A, the 5QI_A, the access type, the PDU session type, and the PDU session ID_A.

Furthermore, the criteria related to the service type may be criteria information for identifying the corresponding service. Specifically, the criteria related to the service type may be criteria information including one or more of the IMS registration related signaling, the MMTEL voice call, the MMTEL video call, and the MO SMS over NAS or MO SMSoIP.

Furthermore, the criteria belonging to all the types may be criteria information that matches in any state.

Furthermore, the SOR-CMCI may include multiple pieces of criteria information. In a case that the multiple pieces of criteria information are included in the SOR-CMCI, the SOR-CMCI may include multiple first timer values. In this case, the criteria information and the first timer value may be associated in a one-to-one relationship.

In other words, in a case that multiple PDU sessions are established, the SOR-CMCI may include multiple pieces of criteria information and multiple first timer values. Moreover, the SOR-CMCI may include multiple pieces of criteria information and multiple first timer values even in a case that multiple services are being performed.

Furthermore, each piece of criteria information may also include priority. In other words, each piece of criteria information may also include information indicating priority of the criteria information.

Conversely, the SOR-CMCI may include only one piece of criteria information. In a case that the criteria information is included in only one piece of SOR-CMCI, the SOR-CMCI may include one first timer value. The criteria information and the first timer value may be associated in a one-to-one relationship in this case as well. Furthermore, the SOR information and/or the SOR transparent container information element may include one or multiple pieces of SOR-CMCI in this case.

In other words, in a case that multiple PDU sessions are established, the SOR information and/or the SOR transparent container may include multiple pieces of SOR-CMCI. Furthermore, the SOR information and/or the SOR transparent container information element may include multiple pieces of SOR-CMCI even in the case that multiple services are being performed.

Furthermore, each piece of SOR-CMCI may include priority. In other words, each piece of SOR-CMCI may also include information indicating priority of the SOR-CMCI.

The SOR-CMCI may be determined based on an operator policy and may be information transmitted from the UDM to the UE.

Steering of roaming (SOR) information may be information of the SOR including information protected by the HPLMN. The Steering of roaming information may include information indicating whether to request acknowledgement (Ack) that is a response indicating successful reception of the Steering of roaming information from the UE.

The SOR information may include information indicating a list of combinations of recommended (or prioritized) PLMNs and access technologies and indicating that it (the list) is included, or information indicating a packet is secured and indicating that it (the packet) is included, and information indicating that the information indicating the lists of the combinations of the recommended PLMNs and the access technologies is not included in the Steering of roaming information since there is no need to change the list of the combinations of the recommended PLMNs and the access technologies stored in the UE.

The SOR information and Ack that is a response indicating that the UE has successfully received the SOR information may be transmitted and/or received by being included in the SOR transparent container information element included in the NAS message.

N1 NAS signalling connection is connection between the UE and the network (AMF) and may be managed and present independently on the 3GPP access and on the non-3GPP access.

A state where the N1 NAS signalling connection is established may be a 5GMM-CONNECTED mode. A state where the N1 NAS signalling connection is not established may be a 5GMM-IDLE mode.

In other words, the state where the N1 NAS signalling connection is established on the 3GPP access may be referred to as a state where the ULE is in a 5GMM-CONNECTED mode over 3GPP access, and the state where the N1 NAS signalling connection is not established on the 3GPP access may be referred to as a state where the UE is in a 5GMM non-connection mode (5GMM-IDLE mode over 3GPP access).

Similarly, a state where the N1 NAS signalling connection is established on the non-3GPP access may be referred to as a state where the UE is in a 5GMM connection mode (5GMM-CONNECTED mode over non-3GPP access), and a state where the N1 NAS signalling connection is not established on the non-3GPP access may be referred to as a state where the UE is in a 5GMM non-connection mode (5GMM-IDLE mode over non-3GPP access) on the non-3GPP access.

The service type may be a type of a service that can be performed by the UE and/or a service that is being performed by the UE. Specifically, the service indicated by the service type may be IMS registration related signalling and/or MMTEL voice call and/or MMTEL video call or MO SMS over NAS (SMSoNAS) and/or MO SMSoIP, or the like.

Note that the IMS may be an abbreviation of IP Multi-media Subsystem. The MMTEL may be an abbreviation of multimedia telephony service. The SMS may be an abbreviation of Short Message Service. The NAS may be an abbreviation of Non-Access-Stratum. The MO may be an abbreviation of Mobile Originated. SMSoIP may be an abbreviation of SMS over IP (networks).

The service type may be a type of access attempt and/or an access category or may indicate a service indicated by such information.

The type of access attempt is a type categorized by a trigger for starting an access in a case that the UE attempts an access (in a case that the UE starts the access attempt) and may be used to determine the access category.

The access category is a category determined by the UE based on the type of the access attempt. In a case that the UE stores an operator-defined access category definition, the UE may use the operator-defined access category definitions to determine the access category.

Modes of the UE in selection of the PLMN include an automatic mode and a manual mode.

The automatic mode is a mode in which the PLMN selection is automatically performed. The UE in this mode selects combinations of the PLMNs and the access technologies in order of priority of the combinations of the PLMNs and the access technologies. Specifically, in this mode, the highest priority combination of the PLMN and the access technology that can be used by the ULE is selected in the PLMN selection. The automatic mode may be referred to as an automatic network selection mode.

The manual mode is a mode in which the user can manually perform PLMN selection. In this mode, the UE (or the MS) shows one or multiple selectable PLMNs to the user, and roaming to the VPLMN is performed only in a case that the user selects one. The manual mode may be referred to as a manual network selection mode.

Steering of Roaming Connected Mode Control Information (SOR-CMCI) is information that allows the network such as the HPLMN to control a timing at which the UE in a connected mode transitions to a non-connected mode for the SOR. The SOR-CMCI may be information based on an operator policy and/or an HPLMM policy. The SOR-CMCI may be information configured for each apparatus or may be information provided as a notification from the NW to the UE.

Each apparatus may manage and/or store multiple pieces of SOR-CMCI for the UE or may manage and/or store one piece of SOR-CMCI.

The SOR-CMCI may be configured to include criteria belonging to one or more PDU sessions and/or one or more service type criteria and/or criteria (condition) indicating a case of matching with all criteria.

The criteria belonging to one PDU session included in one piece of SOR-CMCI may include one piece of S-NSSAI and/or one DNN and/or one piece of 5QI. The criteria belonging to one PDU session included in one piece of SOR-CMCI may further include information indicating one access technology and/or information indicating one PDU session type and/or a value of one PDU session ID. In a case that the criteria belonging to one PDU session includes information belonging to multiple PDU sessions, it may mean the combination thereof.

In a case that multiple PDU sessions is established, one piece of SOR-CMCI may include criteria belonging to multiple PDU sessions. In this case, each of the criteria belonging to each PDU session may include one piece of S-NSSAI and/or one DNN and/or one piece of 5QI and/or information indicating an access technology and/or information indicating the PDU session type and/or a value of the PDU session ID.

Specifically, in a case that multiple PDU sessions is established, each piece of S-NSSAI used by each PDU session and/or each DNN and/or each piece of 5QI may be included in the SOR-CMCI, each access type for which each PDU session is established may be included in the SOR-CMCI, a PDU session type of each PDU session may be included in the SOR-CMCI, or a value of the PDU session ID for identifying each PDU session may be included in the SOR-CMCI.

The criteria belonging to one PDU session included in one piece of SOR-CMCI may include one or more pieces of S-NSSAI and/or one or more DNNs and/or one or more pieces of 5QI. The criteria belonging to one PDU session included in one piece of SOR-CMCI may further include information indicating one or more access technologies and/or information indicating one or more PDU session types and/or values of one or more PDU session IDs.

One service type criterion included in one piece of SOR-CMCI may include information for identifying one or more service types and may include information indicating MMTEL voice call and/or information indicating MMTEL video call and/or information indicating MO SMS over NAS and/or information indicating MO SMSoIP.

In a case that multiple services are being performed, one piece of SOR-CMCI may include multiple service type criteria. In this case, each service type criterion may include information indicating MMTEL voice call and/or information indicating MMTEL video call and/or information indicating MO SMS over NAS and/or information indicating MO SMSoIP.

Specifically, in a case that multiple services are being performed, information for identifying each service may be included in the SOR-CMCI.

Hereinafter, each criterion may mean a criterion belonging to a PDU session and/or a service type criterion and/or a criterion (condition) indicating a case of matching all criteria or may be each piece of information (the S-NSAI, the DNN, the 5QI, or the like) belonging to a PDU session included in the criterion belonging to the PDU session and/or information for identifying a service type included in a service type criterion and/or information indicating a case of matching all criteria.

The SOR-CMCI may include a mapped timer value associated with each criterion. In a case that the SOR-CMCI includes the timer value mapped to the criteria indicating a case that all criteria are matched, the timer value may be configured to be shorter than timer values mapped to other criteria.

The SOR-CMCI may include a value indicating priority associated with each criterion. The value indicating priority may be referred to as a precedence value and the priority of one or more criteria may be determined based on the precedence value. Alternatively, the priority may be indicated by an order of the criteria included in the SOR-CMCI. Specifically, the criteria may be sorted and managed such that the criteria with higher priority are located at higher positions.

A first timer is a timer for determining a timing at which the UE in the connected mode transitions to the non-connected mode for the SOR. The first timer may be Tsor-cm in the 3GPP. The first timer may be managed by the UE and/or the NW. The first timer may be managed for each PDU session, may be managed for each access type, may be managed for each combination of the PDU session and the access type, may be managed for each service type, may be managed for each PLMN, or may be managed for each UE. The timer value to be set for the first timer may be referred to as a first timer value below.

In other words, one or more first timers may be managed for one UE, or one first timer may be managed for one UE. The first timer managed by the UE may store a PDU session ID and/or information indicating an access type and/or information indicating a combination of a PDU session and an access type and/or a service type and/or a PLMN ID in an associated manner.

A criterion with which a selected timer value is associated based on the SOR-CMCI used in selecting the timer value to be set for the first timer and/or information belonging to a PDU session included in the criterion and/or information indicating a service type included in the criterion and/or information indicating the priority with which the criterion is associated may be managed in an associated manner with the first timer and/or the first timer value.

The PDU session identified by the information with which the first timer is associated or the PDU session using the information with which the first timer is associated may be referred to as a PDU session associated with the first timer, and the service identified by the information with which the first timer is associated may be referred to as a service associated with the first timer.

Note that the expression that the first timer is managed here means that the first timer is started and/or stopped and/or expired and/or run. In other words, the expression that the UE and/or the NW manages the first timer means that the UE and/or the NW starts and/or stops and/or expires and/or runs the first timer, and a state where the UE and/or the NW is managing the first timer means that the UE and/or the NW is running the first timer.

Specifically, in a state where multiple PDU sessions are being established, the UE and/or the NW may manage the first timer for each PDU session or manage only one first timer.

Furthermore, in a case that the UE and/or the NW establishes a first PDU session and a second PDU session on the 3GPP access and establishes a third PDU session and a fourth PDU session on the non-3GPP access, the UE and/or the NW may manage the first timer associated with the 3GPP access and the first timer associated with the non-3GPP access or may manage multiple first timers associated with each of the first to fourth PDU sessions at the same time.

Furthermore, in a case that the UE and/or the NW establishes an MA PDU session that establishes user plane resources on both the 3GPP access and the non-3GPP access, the UE and/or the NW may manage the first timer associated with the MA PDU session or may manage the first timer associated with the 3GPP access and the first timer associated with the non-3GPP access at the same time.

2.7. Description of Identification Information in Present Embodiment

Next, description will be given of the identification information transmitted and/or received and stored and managed by apparatuses in the present embodiment.

First identification information in the present embodiment may be capability information of the UE_A 10 indicating that the UE_A 10 supports a function of receiving, from the network, and/or recognizing and/or storing and/or processing information indicating that the disaster condition applies or no longer applies to a PLMN or a specific area of the PLMN.

Here, the information indicating that the disaster condition applies or no longer applies to the PLMN or the specific area of the PLMN may be information transmitted to the UE by the PLMN to which the disaster condition applies or no longer applies or another PLMN (PLMN #2) that is recognized that the disaster condition applies or no longer applies to the PLMN (PLMN #1). Note that in the present document, the information indicating that the disaster condition applies or no longer applies to the PLMN or the specific area in the PLMN is referred to as disaster condition information of the PLMN.

Note that here, the information indicating that the disaster condition applies to the PLMN or the specific area in the PLMN may be third identification information, which will be described later, and the information indicating that the disaster condition no longer applies to the PLMN or the specific area in the PLMN may be fifth identification information, which will be described later. In other words, the first identification information may be capability information of the UE indicating that the function of processing the third identification information and/or the fifth identification information is supported.

Note that the disaster condition information on the PLMN received by the UE may be received from the PLMN to the UE is registered or connected or may be received from a PLMN other than the PLMN to which the UE is registered or connected. Details will be described in description of the third to fifth identification information and a procedure, which will be described below.

The second identification information in the present embodiment may be capability information indicating that a function of transmitting, to the UE, information indicating that the disaster condition applies or no longer applies to the PLMN or the specific area in the PLMN is supported.

Conversely, the second identification information may be capability information indicating that the function of transmitting, to the UE, the information indicating that the disaster condition applies or no longer applies to the PLMN or the specific area in the PLMN is not supported. Unless otherwise particularly indicated, in the present document, the second identification information means the capability information indicating that the function of transmitting, to the UE, the information indicating that the disaster condition applies or no longer applies to the PLMN or the specific area in the PLMN is supported.

Here, the core network may include and transmit the second identification information in a response message based on reception of the first identification information from the UE.

The third identification information in the present embodiment may be identification information indicating that the disaster condition applies to the PLMN and/or identification information indicating the PLMN to which the disaster condition applies.

Here, the information indicating the PLMN to which the disaster condition applies may be a PLMN ID that is identification information of the PLMN to which the disaster condition applies, and further, the third identification information may include one or multiple PLMN IDs.

Here, the third identification information may be information transmitted, to the UE, by the PLMN to which the disaster condition applies, the PLMN to which the information is provided as a notification from the PLMN to which the disaster condition applies, or the PLMN that recognizes or determines that the disaster condition applies to another PLMN.

Furthermore, the third identification information may be a 5GS Mobility Management (5GMM) cause. Moreover, the third identification information may be information indicating that the disaster condition applies or may be the 5GMM cause indicating that the disaster condition applies.

Note that the third identification information may be included in a NAS message transmitted from the core network to the UE, may be included in a session management (SM) message transmitted from the core network to the UE, or may be included in information cell broadcasted by a base station and transmitted to the UE.

Here, the UE that receives the third identification information may add the PLMN indicated by the third identification information to a list for managing PLMNs under the disaster condition managed inside the UE. More specifically, the list for managing the PLMNs under the disaster condition that is managed inside the UE may be a forbidden PLMN list, or may be a new forbidden PLMN list in consideration of the disaster condition, and is not limited thereto.

Furthermore, the UE that receives the third identification information may add the current PLMN to the list for managing the PLMNs under the disaster condition that is managed inside the UE. In other words, the UE that receives the third identification information may add the PLMN ID of the current PLMN to the list for managing the PLMNs under the disaster condition that is managed inside the UE.

The fourth identification information in the present embodiment is identification information indicating the PLMN as a roaming (moving) destination of the UE in a case that the disaster condition applies to the PLMN to which the UE is being currently connected and roaming (moving) to other PLMNs is necessary.

Here, the information indicating the PLMN as the roaming (moving) destination of the ULE may be a PLMN ID that is identification information of the PLMN as the roaming (moving) destination of the UE, and further, the fourth identification information may include one or multiple PLMN IDs.

Here, the PLMN indicated by the fourth identification information may be a PLMN to which the disaster condition does not apply.

Furthermore, the fourth identification information may be a 5G Mobility Management (5GMM) cause. Moreover, the fourth identification information may be information indicating that the disaster condition no longer applies to the PLMN_A or may be a 5GMM cause indicating that the disaster condition no longer applies to the PLMN_A. Here, the PLMN_A may be a PLMN that has previously been registered. Moreover, the PLMN_A may be an HPLMN.

Note that the fourth identification information may be included in the NAS message transmitted from the core network to the UE, may be included in the session management (SM) message transmitted from the core network to the UE, or may be included in the information cell broadcasted by the base station and transmitted to the UE.

Additionally, the PLMN included in the fourth identification information may be a PLMN that supports disaster roaming. Here, the PLMN that supports the disaster roaming is a PLMN capable of accepting roaming of the UE in a case that the disaster condition applies to the PLMN to which the UE is registered or connected.

The fourth identification information may include one or multiple PLMNs. The fourth identification information may be information included in the Steering of Roaming (SOR) transparent container information element (IE) or may be information that is not included in the SOR transparent container IE.

Here, the UE may transition to the deregistered state and register the PLMN indicated by the fourth identification information based on the reception of the fourth identification information. More specifically, the procedure for the UE to transition to a deregistered state may be a de-registration procedure initiated by the UE or the core network or may be an implicit de-registration procedure. A detailed procedure and process will be described later.

Furthermore, the UE that has received the fourth identification information may delete the PLMN_A from the list for managing the PLMNs under the disaster condition that is managed inside the UE. In other words, the UE that receives the fourth identification information may add the PLMN ID of the PLMN_A to the list for managing the PLMNs under the disaster condition that is managed inside the UE. Here, the PLMN_A may be a PLMN that has previously been registered. Moreover, the PLMN_A may be an HPLMN.

The fifth identification information in the present embodiment may be identification information indicating that the disaster condition no longer applies to the PLMN and/or identification information indicating that the PLMN is not under the disaster condition and/or identification information indicating the PLMN to which the disaster condition no longer applies or the PLMN to which the disaster condition does not apply.

Here, the information indicating the PLMN that is not under the disaster condition and/or the PLMN to which the disaster condition no longer applies may be a PLMN ID that is identification information of the PLMN that is not under the disaster condition and/or the PLMN to which the disaster condition no longer applies, and further, the fourth identification information may include one or multiple PLMN IDs.

Here, the fifth identification information may be information transmitted, to the UE, by the PLMN to which the disaster condition no longer applies, the PLMN to which the information is provided as a notification from the PLMN to which the disaster condition no longer applies, or the PLMN that recognizes or determines that the disaster condition no longer applies to other PLMNs.

Note that the fifth identification information may be included in the NAS message transmitted from the core network to the UE, may be included in the session management (SM) message transmitted from the core network to the UE, or may be included in the information cell broadcasted by the base station and transmitted to the UE.

Here, the UE that receives the fifth identification information may delete the PLMN indicated by the fifth identification information from the list for managing the PLMNs under the disaster condition that is managed inside the UE. More specifically, the list for managing the PLMNs under the disaster condition that is managed inside the UE may be a forbidden PLMN list, or may be a new forbidden PLMN list in consideration of the disaster condition, and is not limited thereto.

Note that the third to fifth identification information may be identification information including combinations of each piece of identification information as content. In other words, one piece of identification information may indicate applying or no longer applying the disaster condition to the PLMN or may be identification information indicating one or multiple PLMNs to which the disaster condition applies or nor longer applies. Alternatively, it may be identification information indicating that the disaster condition applies to the PLMN or identification information indicating the PLMN to which the disaster condition applies, and further, it may be identification information including a PLMN as a roaming (moving) destination of the UE which is registered or connected to the PLMN to which the disaster condition applies.

In this case, the UE may update the PLMN list for the disaster condition managed inside the UE based on the identification information combining third to fifth identification information.

The sixth identification information in the present embodiment may information indicating a signal load (signaling overload) of the PLMN to which the disaster condition does not apply or information indicating priority. Furthermore, the sixth identification information may be information indicating a signal load of the PLMN to which the disaster condition no longer applies.

Here, the sixth identification information may be signal load information or information indicated by the fourth identification information and indicating priority of one or multiple PLMNs as roaming destinations of the UE, for example, and the UE that receives the sixth identification information and/or the fourth identification information may be able to select a PLMN in consideration of the condition or the priority of the PLMN as a moving destination based on the sixth identification information. More specifically, the UE may select a PLMN as a moving destination based on the fact that the signal load of the PLMN as the moving destination is small and/or the fact that the priority thereof is high, which is indicated by the sixth identification information, for example.

Note that the information indicating a signal load and/or the information indicating priority of the PLMN included in the sixth identification information may be processed along with the list of preferred PLMN/access technology combinations used in the PLMN selection in the roaming. More specifically, PLMN selection may be performed based on the priority order indicated by the sixth identification information, rather than the priority order based on the order of storage in the list of preferred PLMN/access technology combinations at the time of ordinary PLMN selection.

The seventh identification information is information indicating that the roaming is disaster roaming. The seventh identification information may be a 5GS registration type IE indicating that the procedure is a registration procedure for the disaster roaming. Additionally, the seventh identification information may be configured as information that is different from the 5GS registration type IE.

The eighth identification information is information indicating whether or not the disaster roaming is valid or information indicating whether or not the disaster condition is valid. Here, whether the disaster roaming is valid may be expressed as a Disaster Roaming Indicator (DRI). In other words, in a case that the DRI bit indicates 1, it may indicate that the disaster roaming is valid. In a case that the DRI bit indicates 0, it may indicate that the disaster roaming is not valid. Moreover, whether the disaster condition is valid may be referred to as a Disaster Condition Indicator (DCI). In other words, in a case that the DCI bit indicates 1, it may indicate that the disaster condition is valid. In a case that the DCI bit indicates 0, it may indicate that the disaster condition is not valid.

3. Embodiments in Present Invention

3.1. Description of Procedures Used in Each Embodiment

Next, procedures used in each embodiment will be described. Note that the procedure used in each embodiment includes a registration procedure, a notification procedure, and PLMN selection. Each procedure will be described below.

Note that, in each embodiment, a case that each of the combinations including the HSS and the UDM, the PCF and the PCRF, the SMF and the PGW-C, and the UPF and the PGW-U is configured to form a single apparatus (that is, the same physical hardware, or the same logical hardware, or the same software) as illustrated in FIG. 2 will be described as an example. However, the details described in the present embodiment can also be applied to a case that each of the combinations is configured to form different apparatuses (that is, different pieces of physical hardware, or different pieces of logical hardware, or different pieces of software). For example, between the apparatuses/functions, data may be directly transmitted and/or received, data may be transmitted and/or received via an N26 interface between the AMF and the MME, or data may be transmitted and/or received via the UE.

3.1.2. Registration Procedure

First, the Registration procedure will be described with reference to FIG. 6. Hereinafter, the present procedure will refer to the registration procedure. The registration procedure is a procedure that is initiated by the UE for registration with the access network_B and/or the core network_B and/or the DN and/or the PLMN. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

The UE may start the registration procedure at the time of mobility across tracking areas (TAs). In other words, the UE may start the registration procedure in a case that the UE moves to a TA that is different from the TA indicated by the TA list (or registration area) that the UE stores. Furthermore, the UE may initiate the present procedure in a case that the running back-off timer or any other timer expires. In addition, the UE may initiate the registration procedure in a case that a context of each apparatus needs to be updated due to disconnection and/or deactivation of a PDU session. In addition, in a case that there is a change in capability information and/or a preference, related to PDU session establishment, of the UE, the UE may initiate the registration procedure. In addition, the UE may periodically initiate the registration procedure. Furthermore, the UE may initiate the registration procedure based on completion of the UE configuration update procedure, or based on completion of the registration procedure, or based on completion of the PDU session establishment procedure, or based on completion of the PDU session management procedure, or based on information received from the network in each procedure, or based on expiry or stoppage of the back-off timer. Note that these are not restrictive, and the UE can perform the registration procedure at any timing.

Note that the above described procedure for the UE to transition from a state of not being registered with the network to a state of being registered with the network may be considered to be an initial registration procedure or a registration procedure for initial registration, and the registration procedure performed in a state in which the UE is registered with the network may be considered to be a registration procedure for mobility and periodic registration update or a mobility and periodic registration procedure.

Note that the UE may perform the PLMN selection and select and determine the PLMN requested by the UE before the registration procedure or in an initial state of the registration procedure.

Figure 6:
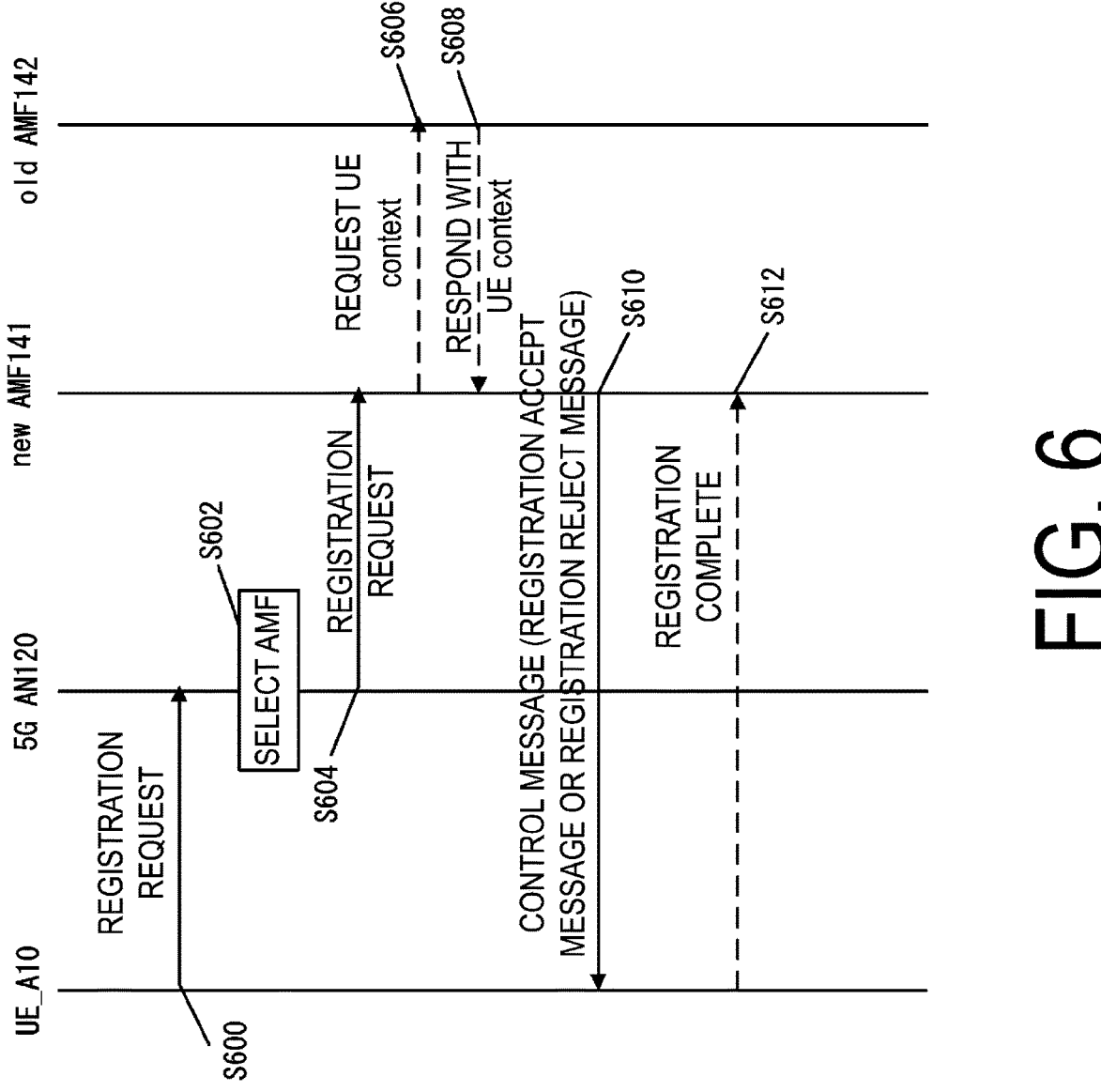
FIG. 6 is a diagram illustrating a registration procedure.

The new AMF 141 in FIG. 6 indicates an AMF in which the UE_A 10 is registered through this procedure, and the old AMF 142 means an AMF in which the UE has been registered in a procedure before this procedure. In a case that no change in AMF occurs in this procedure, an interface between the old AMF 142 and the new AMF 141 and a procedure between the old AMF 142 and the new AMF 141 do not occur, and the new AMF 141 may be the same apparatus as the old AMF 142. Note that in the present document, description of AMF may mean the new AMF 141, may mean the old AMF 142, or may mean both of them. The new AMF 141 and the old AMF 142 may be AMFs 140.

First, the UE_A 10 initiates the registration procedure by transmitting the Registration request message to the new AMF 141 (S600), (S602), and (S604). Specifically, the UE transmits an RRC message including the registration request message to the 5G AN 120 (or the gNB) (S600). Moreover, the registration request message is an NAS message transmitted and/or received over the N1 interface. The RRC message may be a control message transmitted and/or received between the UE and the 5G AN 120 (or the gNB). The NAS message is processed in the NAS layer, and the RRC message is processed in the RRC layer. Note that the NAS layer is a layer higher than the RRC layer.

Here, the UE_A 10 can include and transmit the first identification information and/or the seventh identification information in the registration request message and/or the RRC message. Furthermore, the UE_A 10 may include and transmit identification information indicating the type of this procedure in the registration request message and/or the RRC message. Here, the identification information indicating the type of the present procedure may be a 5GS registration type IE, and may be information indicating that this procedure is the registration procedure for initial registration, or for update of registration information associated with movement, or for periodic update of registration information, or for emergency registration, or for disaster roaming. Note that the seventh identification information may be a 5GS registration type IE indicating that the registration procedure is for disaster roaming.

The UE_A 10 may include capability information of the UE in the registration request message or may include the first identification information therein as capability information of the UE in order to notify the network of the function that the UE_A 10 supports. Here, the UE capability information may be 5GMM capability in the 5GS.

The UE_A 10 may include and transmit the identification information in a control message that is different from the above messages, for example, a control message of a lower layer than the RRC layer (a MAC layer, an RLC layer, or a PDCP layer, for example). Note that the UE_A 10 may indicate that the UE_A 10 supports each function, may indicate a request of the UE, or may indicate both of them, by transmitting these pieces of identification information. Note that information indicating support of each function and information indicating a request for use of each function may be transmitted and/or received as the same piece of identification information, or may be transmitted and/or received as different pieces of identification information.

Note that the UE_A 10 may select or determine whether to transmit the first identification information to the network based on the UE capability information and/or the UE policy and/or the UE state and/or the user registration information and/or a context stored in the UE and/or the like.

The UE_A 10 may include and transmit the first identification information in the registration request message, in a case that the UE_A 10 includes a function of identifying and processing combination information of PLMN IDs and NSSAI (S-NSSAI) supported by the PLMNs, which is used in the PLMN selection and included in the third identification information and/or the fourth identification information. The UE_A 10 may indicate, for the network, that the UE_A 10 supports a function of receiving, from the network, and/or recognizing and/or storing and/or processing information indicating that the disaster condition applies or no longer applies to the PLMN or the specific area of the PLMN, by transmitting the first identification information.

Furthermore, the UE_A 10 may indicate a request for capability information of the network indicating that the network supports the function corresponding to the first identification information, by including and transmitting the first identification information in the registration request message.

The UE_A 10 may include information other than the first identification information in the registration request message and/or the RRC message including the registration request message, and for example, the UE_A 10 may include and transmit the UE ID and/or the PLMN ID and/or the AMF identification information and/or the requested NSSAI.

Here, the AMF identification information may be information for identifying the AMF or a set of AMFs, for example, a 5GS-Temporary Mobile Subscription Identifier (5G-S-TMSI) or a Globally Unique AMF Identifier (GUAMI).

In a case that the UE_A 10 stores "allowed NSSAI associated with the PLMN requested by the UE and the access type requested by the UE" and/or a case that the UE_A 10 stores "configured NSSAI for the requested PLMN" and/or the UE_A 10 stores "default configured NSSAI", the UE may transmit the requested NSSAI to the requested PLMN by including it in the registration request message.

Alternatively, in a case that the UE stores "allowed NSSAI associated with a PLMN that is different from the PLMN requested by the UE and the access type requested by the UE", and the allowed NSSAI or the S-NSSAI included in the allowed NSSAI is further associated with the requested PLMN, the UE_A 10 may transmit the requested NSSAI to the requested PLMN by including it in the registration request message.

Here, the case that the allowed NSSAI associated with a PLMN that is different from the PLMN requested by the UE or the S-NSSAI included in the allowed NSSAI is associated with the requested PLMN may mean that the UE_A 10 stores the allowed NSSAI with multiple PLMNs (the requested PLMN and other PLMNs) in an associated manner, for example.

Alternatively, the case that the allowed NSSAI associated with the PLMN that is different from the PLMN requested by the UE or the S-NSSAI included in the allowed NSSAI is associated with the requested PLMN may be a case that the UE stores the allowed NSSAI associated with the PLMN that is different from the PLMN requested by the UE or the S-NSSAI included in the allowed NSSAI and the PLMN list supporting the S-NSSAI, and the PLMN requested by the UE is included in the PLMN list.

In addition, the UE_A 10 may include the S-NSSAI included in the allowed NSSAI associated with the PLMN that is different from the PLMN requested by the UE in the requested NSSAI.

Alternatively, the UE_A 10 may include the mapped S-NSSAI of the S-NSSAI included in the allowed NSSAI associated with the PLMN that is different from the PLMN requested by the UE in the Requested mapped NSSAI in the 5GS.

Alternatively, the UE_A 10 may transmit, to the network, the S-NSSAI included in the allowed NSSAI associated with the HPLMN by including it in the Requested mapped NSSAI in the 5GS in the registration request procedure for the VPLMN.

The UE_A 10 may include and transmit an SM message (for example, the PDU session establishment request message) in the registration request message, or may transmit an SM message (for example, the PDU session establishment request message) together with the registration request message to thereby initiate the PDU session establishment procedure during the registration procedure.

In a case that the 5G AN 120 (or the gNB) receives the RRC message including the registration request message, then the 5G AN 120 (or the gNB) selects the AMF to transfer the registration request message (S602). Note that the 5G AN 120 (or the gNB) can select the AMF based on one or more pieces of identification information included in the registration request message and/or the RRC message including the registration request message. Specifically, the 5G AN (or the gNB) may select the new AMF 141 as a transmission destination of the registration request message based on the first identification information.

For example, the 5G AN 120 (or the gNB) may select an AMF supporting the function corresponding to the capability information indicated by the first identification information based on the first identification information. Specifically, the 5G AN (or the gNB) may select an AMF having a function for generating and transmitting information that corresponds to the capability information of the UE indicated by the first identification information and indicates that the disaster condition applies or no longer applies to the PLMN with which the UE has registered or other PLMNs or information indicating the PLMN to which the disaster condition applies or no longer applies.

Note that the method of selecting the AMF is not limited to that described above and the 5G AN (or the gNB) may select the AMF based on other conditions. The 5G AN (or the gNB) extracts the registration request message from the received RRC message and transfers the registration request message to the selected new AMF (S604). Note that in a case that the first identification information is not included in the registration request message and is included in the RRC message, the identification information included in the RRC message may be transmitted to the selected AMF (new AMF 141) along with the registration request message (S604).

The new AMF 141 may recognize that the UE is requesting the disaster roaming and/or the disaster roaming is occurring, based on the seventh identification information in a case that the new AMF 141 receives the registration request message.

In a case of receiving the registration request message, the new AMF 141 can perform first condition fulfillment determination. The first condition fulfillment determination is performed by the network (or the new AMF 141) to determine whether or not to accept the request from the UE. In a case that the first condition fulfillment determination is true, the new AMF 141 performs the procedure from S606 to S612. On the other hand, in a case that the first condition fulfillment determination is false, the new AMF 141 may skip the procedure from S606 to S608 and perform the procedure in S610.

Alternatively, the new AMF 141 may perform the first condition fulfillment determination after requesting a UE context from the old AMF 142 and then receiving the UE context from the old AMF 142 (S606 and S608). In that case, the new AMF 141 may perform S610 and/or S612 in a case that the first condition fulfillment determination is true. On the other hand, in a case that the first condition fulfillment determination is false, the new AMF 141 may perform S610.

Note that in this regard, the control message transmitted and/or received in S610 may be the Registration accept message in a case that the first condition fulfillment determination is true, and the control message transmitted and/or received in S610 may be the Registration reject message in a case that the first condition fulfillment determination is false.

Note that the first condition fulfillment determination may be performed based on reception of the registration request message, and/or each piece of identification information included in the registration request message, and/or subscriber information, and/or capability information of the network, and/or an operator policy, and/or a state of the network, and/or registration information of a user, and/or a context stored in the AMF, and/or the like.

For example, the first condition fulfillment determination may be true in a case that the network allows the request from the UE, and the first condition fulfillment determination may be false in a case that the network does not allow the request from the UE. In a case that a network with which the UE is to be registered and/or an apparatus in the network supports the function requested by the UE, the first condition fulfillment determination may be true, whereas in a case that the network and/or the apparatus does not support the function requested by the UE, the first condition fulfillment determination may be false. In addition, in a case that the transmitted and/or received identification information is allowed, the first condition fulfillment determination may be true, whereas in a case that the transmitted and/or received identification information is not allowed, the first condition fulfillment determination may be false.

In a case that the S-NSSAI included in the requested NSSAI received by the AMF from the UE is information for identifying a slice that requires the NSSAA procedure, and further, in a case that the AMF stores success for results of the NSSAA procedure of a corresponding S-NSSAI for the UE, the first condition fulfillment determination may be true. Alternatively, the first condition fulfillment determination may be false in a case that no S-NSSAI is allowed for the UE and that no allowed NSSAI is scheduled to be allocated to the UE in the future as well.

The first condition fulfillment determination may be true in a case that the S-NSSAI included in the requested NSSAI received by the AMF from the UE is information for identifying a slice requiring management of the maximum number of UEs connected to the slice and further that the maximum number of UEs is not reached. Alternatively, in a case that no S-NSSAI is allowed for the UE as well, the first condition fulfillment determination may be true in a case that the allowed NSSAI is expected to be allocated to the UE in the future as well.

For the AMF, the first condition fulfillment determination may be true or may be false in a case that no S-NSSAI is allowed for the UE and that the first NSSAI is allocated to the UE.

The new AMF 141 performs the procedure in S606 and S608 in a case that the AMF indicated by the AMF identification information included in the message received by the new AMF 141 from the UE is the old AMF 142, and does not perform the procedure in S606 and S608 in a case that the AMF indicated by the AMF identification information included in the message received by the new AMF 141 from the UE_A 10 is the new AMF 141. In other words, the procedure in S606 and S608 is performed in a case that a change in AMF (AMF change) occurs due to this procedure, and the procedure in S606 and S608 is skipped in a case that a change in AMF does not occur.

A UE context transfer procedure will be described (S606 and S608). The new AMF 141 transmits a UE context request message to the old AMF 142 (S606). The old AMF 142 transmits the UE context to the new AMF 141 based on the received UE context request message. The new AMF 141 generates a UE context based on the received UE context.

Here, the UE context transmitted from the new AMF 141 to the old AMF 142 may include the UE ID and the allowed NSSAI. The UE context may include the configured NSSAI and/or rejected NSSAI, the NSSAI and/or pending NSSAI, and/or the first NSSAI. Information as to whether notification to the UE has been completed may be linked to the allowed NSSAI and/or the configured NSSAI and/or the rejected NSSAI and/or the pending NSSAI, and/or the first NSSAI included in the UE context and the S-NSSAI included in each piece of NSSAI.

The UE context may include information of the S-NSSAI that requires the NSSAA procedure, and/or information indicating authentication that the NSSAA procedure has completed for the UE has succeeded, and/or information indicating that the authentication has failed.

The UE context may include the information of the S-NSSAI requiring management of the maximum number of UEs connected to the slice, and/or information indicating that the maximum number of UEs has been reached, and/or information indicating whether the maximum number of UEs connected to the slice has been reached.

Note that the information regarding the characteristics of the S-NSSAI may be managed as one piece of information, and specifically, the network may associate with each other and store, for each piece of S-NSSAI, information indicating whether the NSSAA is required, whether the NSSAA is successful, whether the maximum number of UEs connected to the slice requires to be managed, and whether the maximum number of UEs connected to the slice has been reached.

The new AMF 141 may transmit the control message to the UE based on the determination of the first condition fulfillment determination and/or based on the UE context from the old AMF 142 (S610). The control message may be the registration accept message, or may be the registration reject message. Hereinafter, a case that the control message transmitted to the UE is a registration accept message will be described.

The new AMF 141 may include and transmit at least the second identification information and/or the eighth identification information in the control message. Note that the new AMF 141 may indicate that the network supports the function indicated by the identification information, may indicate that the request of the UE is accepted, may indicate that the request from the UE is not allowed or is not supported, or combination of these information, by transmitting the identification information and/or the control message.

Here, the second identification information may be capability information indicating that the new AMF 141 and/or the core network supports the function corresponding to the capability information indicated by the first identification information received from the UE.

Even in a case that the first identification information is received from the UE, and the second identification information is not included in the control message that is the registration accept message, the new AMF 141 may indicate, for the UE, that the new AMF 141 and/or the core network recognizes the capability information of the UE indicated by the first identification information and/or the core network indicates, for the UE, that the new AMF 141 and/or the core network supports the function corresponding to the capability indicated by the first identification information. Conversely, in a case that the second identification information is not included in the control message that is the registration message, the new AMF 141 may indicate, for the UE, that the new AMF 141 and/or the core network does not recognize the capability information of the UE indicated by the first identification information, and/or the core network may indicate, for the UE, that the new AMF 141 and/or the core network does not support the function corresponding to the capability indicated by the first identification information.

In a case that the first identification information is not received from the UE, the new AMF 141 may include and transmit the second identification information in the control message, or need not include and transmit the second identification information in the control message.

The new AMF 141 may further transmit, to the UE_A 10, the configured NSSAI and/or the allowed NSSAI and/or the rejected NSSAI and/or the pending NSSAI and/or the first NSSAI by including them in the control message.

In a case that there is no S-NSSAI (allowed NSSAI) allowed for the UE at the time of transmitting the control message, but there is a schedule to perform the NSSAA procedure after completion of this procedure or in parallel with this procedure, or in a case that the NSSAA procedure is being performed between the UE and the network, or in a case that the pending NSSAI is included and transmitted in the control message, the new AMF 141 may include and transmit a null value in the allowed NSSAI.

Note that the AMF may select and determine whether or not to include the second identification information in the control message based on each piece of identification information received from the UE and/or subscriber information and/or capability information of the network and/or the operator policy and/or the state of the network and/or the registration information of the user and/or the context held by the AMF, and the like.

In a case that the control message is the registration accept message, the AMF can either include and transmit an SM message (for example, the PDU session establishment accept message) in the registration accept message, or transmit an SM message (for example, the PDU session establishment accept message) together with the registration accept message. Note that, such a transmission method may be performed in a case that the SM message (for example, the PDU session establishment request message) is included in the registration request message. The transmission method may be performed in a case that the SM message (for example, the PDU session establishment request message) is transmitted along with the registration request message. By performing such a transmission method as described above, the AMF can indicate that a procedure for SM is accepted in the registration procedure.

By transmitting the registration accept message based on each piece of received identification information, and/or subscriber information, and/or capability information of the network, and/or the operator policy, and/or the state of the network, and/or the registration information of the user, and/or the context stored in the AMF, and/or the like, the AMF may indicate that the request from the UE is accepted, or by transmitting the registration reject message, the AMF may indicate that the request from the UE is rejected.

The UE receives the control message via the 5G AN (gNB) (S608). In a case that the control message is the registration accept message, then by receiving the registration accept message, the UE can recognize that the request from the UE on the registration request message is accepted, and recognize contents of various pieces of identification information included in the registration accept message. Alternatively, in a case that the control message is the registration reject message, then by receiving the registration reject message, the UE can recognize that the request from the UE using the registration request message is rejected and recognize the content of various pieces of identification information included in the registration reject message. In a case that the UE does not receive the control message even after a prescribed time period has elapsed after transmitting the registration request message, the UE may recognize that the request from the UE is rejected.

Note that the UE may recognize whether or not the disaster roaming is valid or whether or not the disaster condition is valid based on the received eighth identification information.

Furthermore, in a case that the control message is the registration accept message, the UE can further transmit to the AMF a registration complete message as a response message to the registration accept message via the 5G AN (gNB) (S610). Note that, in a case that the UE receives the SM message such as the PDU session establishment accept message, the UE may include and transmit an SM message such as a PDU session establishment complete message in the registration complete message, or may indicate that the procedure for SM has been completed by including the SM message. Here, the registration complete message is a NAS message transmitted and/or received over the N1 interface; however, between the UE and the 5G AN (gNB), the registration complete message is transmitted and/or received by being included in an RRC message.

The AMF receives the registration complete message via the 5G AN (gNB) (S612). Each apparatus completes the present procedure based on transmission and/or reception of the registration accept message and/or the registration complete message.

Alternatively, each apparatus may complete the registration procedure based on the transmission and/or the reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGIS-TERED state or a 5GMM-DEREGISTERED state) over the access in which the UE has received the registration reject message for the current PLMN based on the transmission and/or reception of the registration reject message. The transition of each apparatus to each state may be performed based on transmission and/or reception of the registration complete message and completion of the registration procedure.

In addition, each apparatus may perform processing based on information transmitted and/or received in the registration procedure, based on completion of the registration procedure. For example, in a case that information indicating that a part of the request from the UE is rejected is transmitted and/or received, a reason for rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Furthermore, the UE may delete one or multiple pieces of NSSAI to be stored based on completion of the registration procedure. Specifically, the UE_A 10 may delete the first rejected NSSAI and/or the third rejected NSSAI and/or the first NSSAI to be stored in a case that the UE_A 10 has transitioned to the deregistered state on both the accesses (the 3GPP access and the non-3GPP access) for the current PLMN based on completion of this procedure.

Furthermore, the UE_A 10 may delete the second rejected NSSAI associated with the current PLMN, the current registration area, and/or the access type thereof in a case that the UE_A 10 has transitioned to the deregistered state on the accesses (3GPP access and the non-3GPP access) for the current PLMN based on the completion of this procedure, or in a case that the UE_A 10 has successfully performed the registration procedure in the new registration area, or in a case that the UE_A 10 has transitioned to the deregistered state or the registration state on a certain access as a result of performing the registration procedure in the new registration area.

Furthermore, each apparatus may initiate the registration procedure again based on the expiry or stoppage of the back-off timer.

Furthermore, each apparatus may initiate the registration procedure again based on the updating of the NSSAI to be stored.

Furthermore, each apparatus may initiate the SM procedure by transmitting and/or receiving the SM message based on transitions to or maintaining of a state where the UE is registered with the network (RM_REGISTERED state or 5GMM-REGISTERED state).

3.1.3. Notification Procedure

Figure 7:
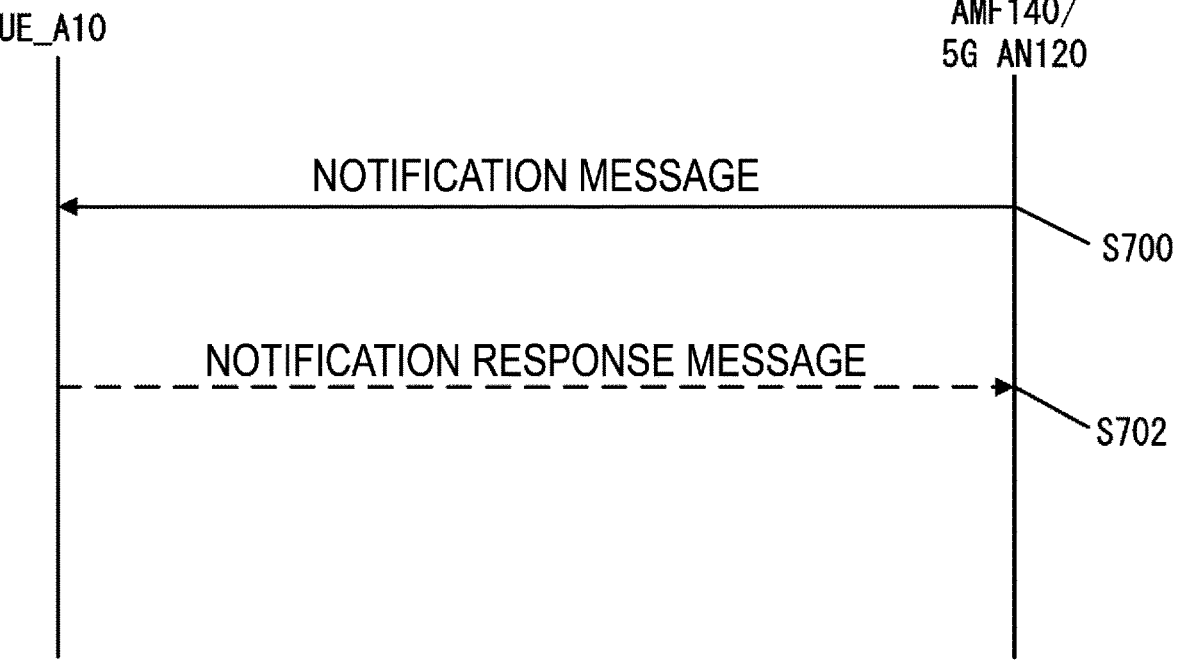
FIG. 7 is a diagram illustrating a notification procedure.

Next, a notification procedure will be described by using FIG. 7. Note that the notification procedure will also be referred to as this procedure in this chapter. An object of this procedure may be a procedure for notifying the UE of the fact that the disaster condition applies or no longer applies to the PLMN and may be a procedure for further notifying the UE that is registered or connected to the PLMN (PLMN D) to which the disaster condition applies of information of the PLMN (PLMN A) as a moving (roaming) destination and/or information for selecting the PLMN as the moving destination.

This procedure may be a procedure for transmitting some or all of the pieces of information indicated by the third to sixth identification information from the core network to the UE based on the first identification information transmitted by the UE_A 10 and/or the second identification information transmitted by the core network in the registration procedure in Chapter 3.1.2.

Here, this procedure may be a procedure initiated by the network or initiated by the UE, and specifically, this procedure may be a registration procedure for updating registration periodically or at an arbitrary timing and/or UE configuration update procedure (Generic UE configuration update procedure) and/or a NAS transport procedure initiated by the network and/or the de-registration procedure initiated by the network and/or the cell broadcasting, for example.

This procedure may be initiated by the AMF 140 and/or the 5G AN 120 and/or the core network transmitting a notification message to the UE (S700) first.

Here, the notification message may be a registration accept message, a registration reject message, a de-registration request message, a configuration update command message, a DL NAS TRANSPORT message, or cell broadcasting from the 5G AN 120, but is not limited thereto.

The notification message may be a NAS message.

Furthermore, the AMF 140 and/or the 5G AN 120 may transmit one or more pieces of third to sixth identification information to the UE by including them in the notification message.

Subsequently, the UE that receives the notification message may or may not transmit a notification response message in response to the notification message to the AMF 140 and/or the 5G AN 120 (S702).

Here the notification response message may be a registration complete message, a configuration update complete message, or a de-registration accept message, but is not limited thereto, and may be a response message corresponding to the notification message received by the UE.

Note that this procedure may be completed based on the reception of the notification message by the UE (S700)

and/or the transmission of the notification response message from the UE to the AMF 140 and/or the 5G AN 120 and/or the core network (S702).

In the following description of each procedure and/or processing, the UE may be in a state of being registered in any of the PLMN by using the registration procedure described in Chapter 3.1.2. The transmission of the notification message means transmission by the AMF 140 and/or the 5G AN 120 and/or the core network unless otherwise particularly stated.

Next, behaviors or processing of the UE that receives one or more pieces of third to sixth identification information included in the notification message in this procedure will be described.

The UE receives the notification message from the core network. The notification message may include one or more pieces of third to sixth identification information. In other words, the UE may receive one or more pieces of the third to sixth identification information from the core network.

First, a case that the UE is registered or connected to the PLMN (PLMN D) to which the disaster condition applies will be described.

The UE receives the notification message from the core network. The notification message may include one or more pieces of third to sixth identification information. In other words, the UE may receive one or more pieces of the third to sixth identification information from the core network.

In a case that the UE receives the third identification information and/or the fourth identification information included in the notification message from the AMF 140 and/or the 5G AN 120 and/or the core network, the UE may recognize the PLMN to which the disaster condition applies based on the third identification information and perform the procedure for transitioning to the deregistered state since the PLMN is the PLMN (PLMN D) to which the UE is connected or registered. Here, the procedure for transitioning to the deregistered state may be a de-registration procedure initiated by the UE or initiated by the network, an implicit de-registration, or the like. The UE brought into the deregistered state may recognize or select the PLMN as a moving destination based on the fourth identification information.

Note that the behaviors or the processing of the UE transitioned to the deregistered state based on the identification information included in the notification message may be any of the following behaviors or processing here.

For example, in a case that the UE receives the third identification information included in the notification message and does not receive the fourth identification information, the UE transitioned to the deregistered state may perform the PLMN selection for ordinary roaming based on the list of preferred PLMN/access technology combinations except for the PLMN to which the disaster condition applies.

In a case that the sixth identification information is received in addition to the third identification information and the fourth identification information, for example, the UE transitioned to the deregistered state may perform the PLMN selection based on the sixth identification information in a case that there are multiple roaming destination PLMNs indicated by the fourth identification information.

Next, a case that the UE is registered or connected to the PLMN (PLMN A) to which the disaster condition does not apply will be described.

In a case that the UE receives the third identification information and/or the fourth identification information and/ or the sixth identification information included in the notification message, the UE may recognize the PLMN to which the disaster condition applies based on the third identification information and not transition to the non-connected state in a case that the PLMN is not the PLMN to which the UE is registered or connected, and then perform communication in the PLMN (current PLMN) to which the UE is currently registered or connected, and further, the UE may recognize that the procedure is forbidden for the PLMN indicated by the third identification information and add the PLMN indicated by the third identification information to the forbidden PLMN list for the disaster condition.

Further, in a case that the UE receives the notification message including the third identification information, the UE may recognize that the disaster condition applies to the current PLMN or may add the current PLMN to the forbidden PLMN list for the disaster condition. In other words, in a case that the UE receives the notification message including the third identification information, the UE may recognize that the current PLMN cannot be used due to the application of the disaster condition or may add the PLMN ID indicating the current PLMN to the forbidden PLMN list for the disaster condition.

Conversely, in a case that the UE receives the notification message including the fourth identification information, the UE may recognize that the disaster condition no longer applies to the PLMN_A or may delete the PLMN_A from the forbidden PLMN list for the disaster condition. In other words, in a case that the UE receives the notification message including the fourth identification information, the UE may recognize that the PLMN_A can be used due to no longer application of the disaster condition or may delete the PLMN ID indicating the PLMN_A from the forbidden PLMN list for the disaster condition. Here, the PLMN_A may be a PLMN that has previously been registered. Moreover, the PLMN_A may be an HPLMN.

Note that behaviors or processing of the UE that does not transitioned to the deregistered state based on the identification information included in the notification message may be any of the following behaviors or processing here.

For example, the UE that has received the fifth identification information in addition to the third identification information and/or the fourth identification information and/ or the sixth identification information included in the notification message may perform roaming to the PLMN indicated by the fifth identification information. Note that detailed processing including the identification information will be described in the following first to fourth embodiments.

Note that this procedure may be performed based on the fact that the disaster condition applies or no longer applies to a PLMN, may be performed based on the fact that a certain PLMN is notified by another PLMN of the fact that the disaster condition is applied or no longer applied, or may be performed based on the fact that a certain PLMN has detected or recognized, by means other than the notification, the fact that the disaster condition has applied or no longer applied to another PLMN. The trigger or the condition for this procedure is not limited thereto.

3.1.4. PLMN Selection

Next, processing related to the PLMN selection will be described.

Typically, the PLMN selection is processing of the UE of selecting the PLMN as a registration destination before the UE in the deregistered state performs the registration procedure, but the PLMN selection may be mainly performed by the UE based on the fact that the disaster condition applies or no longer applies to the PLMN, in the present embodiment.

The PLMN selection may be processing performed by the UE in a case that it becomes necessary to move (roam) to another network (PLMN) since the disaster condition applies to the PLMN to which the UE is registered or connected or the specific area of the PLMN, or in a case that it becomes necessary to switch to another PLMN (VPLMN) due to mobility from the PLMN (here, the HPLMN) to which the UE is currently registered and/or connected, or in a case that the power source is turned on in an area other than the HPLMN, for example.

More specifically, the PLMN selection may be processing performed for the UE to transition to the deregistered state through the de-registration procedure initiated by the UE or initiated by the network, implicit de-registration, or the like in the network to which the disaster condition applies, in a case that it becomes necessary to move (roam) to another network (PLMN) since the disaster condition applies to the PLMN to which the UE is registered or connected or the specific area in the PLMN, for example.

Noe that details of the processing in this procedure will be further described in the first to fourth embodiments.

The PLMN selection in the present embodiment may be performed based on the SOR transparent container information element received and stored by the UE_A 10 in the registration procedure and/or the update procedure regardless of the identification information received by the UE in the notification procedure or the like, for example, and the PLMN selection may be performed in the automatic mode that is automatically performed or may be performed in the manual mode that the user manually performs based on the available PLMN indicated by the UE_A 10. Here, the PLMN selection in the automatic mode may be used in the registration procedure performed next after the highest priority combination is selected from the combinations of the PLMN IDs and the access technologies. Here, the priority order may be the order in which the combinations of the PLMNs and the access technologies are stored, and the priority order of the PLMN ID included in the first stored combination of the PLMN ID and the access technology may be the highest.

3.2. First Embodiment

The first embodiment of the present invention is an embodiment including procedures and processing for providing a notification to the UE by using a NAS message in the notification procedure described in Chapter 3.1.3 in a case that the disaster condition applies to the PLMN to which the UE is registered or connected. Note that the NAS message may be transmitted and/or received during a registration procedure for updating registration periodically or at an arbitrary timing and/or during a UE configuration update procedure (Generic UE configuration update procedure) and/or during a NAS transport procedure initiated by the network and/or during a de-registration procedure initiated by the network, for example.

Note that the present embodiment may be performed by a combination of one or more of the procedures or processing described in Chapter 3.1 and may be an embodiment in a case that the UE transmits the registration request message including the first identification information to the core network and the registration request message is accepted in the registration procedure described in Chapter 3.1.2, or in a case that the UE receives the accept message including the second identification information from the core network.

In the present embodiment, the UE may recognize the PLMN to which the disaster condition applies, based on the third identification information in a case that the UE receives, as the NAS message, the third identification information and/or the fourth identification information and/or the sixth identification information included in the notification message described in Chapter 3.1.3, the UE may perform the procedure for transitioning to the deregistered state in a case that the recognized PLMN is the PLMN to which the UE is connected or registered, and the UE may store the PLMN ID included in the third identification information in a case that the recognized PLMN is not the PLMN to which the UE is connected or registered, for example.

Subsequently, the UE that has completed the procedure for transitioning to the deregistered state may perform the PLMN selection based on the fourth and/or sixth identification information. The following detailed procedure will further be described in the second to fourth embodiments as well.

Note that in the present embodiment, similar procedures or processing may be performed even in a case that the disaster condition no longer applies to the PLMN to which the UE is registered or connected. The notification provided in the case that the disaster condition no longer applies to the PLMN may be provided in response to reception, by the UE, of the notification message including the fifth identification information, for example.

3.3. Second Embodiment

The second embodiment of the present invention is an embodiment related to behaviors of the UE in a case that the disaster condition applies or no longer applies to the PLMN to which the UE is registered or connected and the network notifies the UE of the fact that the disaster condition applies or no longer applies to the PLMN. In other words, the second embodiment is an example related to behaviors of the UE based on the fact that the UE receives, from the network, information indicating that the disaster condition applies or no longer applies to the PLMN or the specific area in the PLMN. Hereinafter, the second embodiment will also be referred to as the present embodiment in this section.

Note that the present embodiment may be performed by a combination of one or more of the procedures or processing described in Chapter 3.1 and may be an embodiment in a case that the UE transmits the registration request message including the first identification information to the core network and the registration request message is accepted in the registration procedure described in Chapter 3.1.2, or in a case that the UE receives the accept message including the second identification information from the core network.

The present embodiment may be a case that the UE transmits the registration request message including the first identification information to the core network and the core network and/or the apparatus in the core network supports the function corresponding to the first identification information in the registration procedure described in Chapter 3.1.2, and further, the present embodiment may be performed by a combination of one or more procedures or pieces of processing described in Chapter 3.1.

First, behaviors or restriction of the behaviors related to the procedure between the UE and the network in a case that a notification indicating that the disaster condition applies or no longer applies to the PLMN or information (one or more PLMN IDs) of the PLMNs to which the disaster condition applies or no longer applies is received will be described in the present embodiment.

The UE in the present embodiment does not perform the procedure for managing movement and/or the procedure for the session management, except for procedures described later, for the PLMN ID (PLMN D) indicated by the identification information, in a case that, through the notification procedure described in Chapter 3.1.3, the UE receives the third identification information, for example, as information indicating that the disaster condition applies to any one or multiple PLMNs or areas of the PLMNs. More specifically, in a case that the UE is registered or connected to the PLMN D, for example, the UE that receives the information indicating that the disaster condition applies to the PLMN (PLMN D) is allowed to perform a PDU session opening procedure initiated by the UE and/or a procedure other than the de-registration procedure on the PLMN D, or may be forbidden to perform all the procedure initiated by the UE, and/or may be allowed to perform only the procedures initiated by the network. More specifically, the procedure forbidden for the UE may be the PDU session probability procedure, may be the PDU session change procedure, may be service request procedure, or may be a registration procedure for mobility and periodic registration update and is not limited thereto. Conversely, the procedure allowed for the UE may be implicit de-registration, may be de-registration procedure initiated by the UE, or may be a de-registration procedure initiated by the core network and is not limited thereto.

Note that in a case that the UE has registered with the PLMN D and/or establishes the PDU session, and all the procedures cannot be forbidden or performed, implicit de-registration or opening of the PDU session through local release may be performed here.

Conversely, in a case that the UE receives the fifth identification information, for example, as the information indicating that any one or multiple PLMNs or areas of the PLMNs to which the disaster condition has no longer applied, the UE may be allowed to perform all the movement management procedures and/or session management procedures on the PLMN ID (PLMN A) indicated by the identification information. Note that the execution of each of the aforementioned procedures may be contracted based on signal load information for each PLMN and/or priority indicated by the network in the third embodiment described later. Details will be described in Chapter 3.4.

Next, behaviors related to handling of the information inside the UE in a case that a notification indicating that the disaster condition applies or no longer applies to a PLMN or information regarding a PLMN to which the disaster condition applies or no longer applies (one or more PLMN IDs) is received will be described in the present embodiment.

In a case that the UE receives the third identification information, for example, as the information indicating that the disaster condition applies to any one or multiple PLMNs or areas of the PLMNs, through the notification procedure described in Chapter 3.1.3, the UE in the present embodiment may add the PLMN ID (PLMN D) indicated by the identification information to the forbidden PLMN list for the disaster condition managed inside the UE and/or the ordinary forbidden PLMN list to manage the PLMN IDs for which registration is forbidden.

Note that the forbidden PLMN list for the disaster condition and/or zero or more PLMN IDs included in the forbidden PLMN list are PLMNs to which the disaster condition applies, and the UE does not perform the procedure for registration and/or connection to the PLMNs as described above. In other words, the UE may be forbidden to perform any procedures on the PLMN IDs included in the forbidden PLMN list.

Conversely, in the present embodiment, in a case that the UE receives, from the AMF 140 and/or the 5G AN 120 and/or the core network, the fifth identification information, for example, as the information indicating that the disaster condition has no longer applied to any one or multiple PLMNs or areas of the PLMNs, through the notification procedure described in Chapter 3.1.3, the UE may delete the PLMN ID (PLMN A) indicated by the identification information from the forbidden PLMN list for the disaster condition managed inside the UE and/or the ordinary forbidden PLMN list for managing the PLMN IDs for which registration is forbidden. In other words, in a case that the UE receives the fifth identification information from the PLMN to which the UE is registered or connected or the core network, the UE may delete the PLMN IDs indicated by the fifth identification information or included in the fifth identification information from the forbidden PLMN list for the disaster condition managed inside the UE and/or the ordinary forbidden PLMN list, based on the reception of the fifth identification information.

Note that the deletion of the PLMN IDs from the forbidden PLMN list for the disaster condition is not limited thereto and may be performed based on UE power on/off or insertion or removal of the USIM.

The PLMN ID that is not included in the forbidden PLMN list may be a PLMN ID to which the disaster condition does not apply or that the UE does not recognize the application of the disaster condition, the UE may perform the processing such as PLMN selection based on information included in the SOR transparent container information element, for example, and/or the subsequent movement management procedure and/or the session management procedure.

3.4. Third Embodiment

The third embodiment of the present invention is an embodiment related to processing in a case that the UE selects the PLMN based on received information in a case that the PLMN which the UE has been registered in or connected to has applied the disaster condition and the network has notified the UE of the information including that the disaster condition has been applied.

Note that one of the objects of the present embodiment is to avoid a load due to concentration of accesses for registration or connection to other PLMNs (including the PLMN #2) in a case that the UE roams from a PLMN (PLMN #1) to another PLMN (for example, the PLMN (PLMN #2) due to the application of the disaster condition to the PLMN (PLMN #1). Also, one of the objects of the present embodiment is to avoid a load due to concentration of access for registration or connection to other PLMNs (including the PLMN #1) in a case that the UE that is registered or connected to another PLMN (for example, the PLMN #2) due to application of the disaster condition to the PLMN (PLMN #1) returns to another PLMN (including the PLMN #1) due to no longer application of the disaster condition applied to the PLMN #1.

3.4.1.

Here, a case will be assumed in which the UE selects the second PLMN (also referred to as the PLMN #2) in a case that the disaster condition applies to the registered first PLMN (also referred to as the PLMN #1) and the second PLMN receives a first list and a second list.

Here, the first list and the second list may include system information and/or an MM message and/or an SM message and/or the messages transmitted and/or received through the procedures in Chapter 3.1.2 to 3.1.3.

The first list may include one or more PLMN IDs indicating one or more PLMNs to which the disaster condition applies. The first list may be third identification information. Note that the first list may be a list of PLMNs that are not used in the PLMN selection at the time of the disaster roaming.

The second list may include one or more sets of PLMN IDs indicating PLMNs which support the disaster roaming and to which the disaster condition does not apply and information regarding signal loads (signaling overload) for the PLMN IDs or priority information for the PLMN IDs. The second list may be sixth identification information. The second list may be a list of PLMNs used for the PLMN selection at the time of the disaster roaming.

The signal load information may indicate whether or not the PLMNs are in the loaded state. Specifically, the signal load information may indicate whether or not the PLMNs are in the loaded state (whether or not the PLMNs are in a congested state) or may be a numerical value such as "a utilization rate: x %".

How high or low the priority is in the priority information may be indicated by how large or small the numerical value is. In other words, smaller numerical values may indicate higher priority or vice versa.

In a case that the PLMN ID included in the first list indicates the first PLMN, the UE need not detect that the first PLMN is under the disaster condition and perform disaster roaming to the first PLMN. Then, the UE may recognize a PLMN which supports the disaster roaming and to which the disaster condition does not apply, based on the PLMN ID included in the second list. Then, the UE may select a PLMN corresponding to the signal load information indicating that the PLMN is not in the load state or a PLMN corresponding to the priority information indicating the highest value of priority from the second list. In other words, the UE need not select any PLMN from the first list.

Note that the UE may select a PLMN indicated by a PLMN ID that is not indicated by the first list from the forbidden PLMN list instead of the above selection method in a case of selecting the PLMN. The UE may select a PLMN indicated by a PLMN ID indicated by the second list from the forbidden PLMN list instead of the above selection methods in a case of selecting the PLMN.

The second list may be configured in the form including one or more PLMN IDs indicating PLMNs which supports the disaster roaming, to which the disaster condition does not apply, and which is not in the loaded state. In a case that the network side determines whether or not the PLMN as the roaming destination is in the loaded state, for example, the second list may be configured in this manner. The UE may select the PLMN indicated by the PLMN ID included in the second list in a case of selecting the PLMN. In other words, the UE need not select any PLMN from the first list.

Note that the UE may select a PLMN indicated by a PLMN ID that is not indicated by the first list from the forbidden PLMN list instead of the above selection method in a case of selecting the PLMN. The UE may select a PLMN indicated by a PLMN ID indicated by the second list from the forbidden PLMN list instead of the above selection methods in a case of selecting the PLMN.

3.4.2.

Here, a case is assumed in which, in the first PLMN (also referred to as a PLMN #1) to which the UE is registered, the UE receives the first list and the second list for the first PLMN in a case that the disaster condition applies to the first PLMN.

Here, the first list and the second list may include system information and/or an MM message and/or an SM message and/or the messages transmitted and/or received through the procedures in Chapter 3.1.2 to 3.1.3.

The first list may include one or more PLMN IDs indicating one or more PLMNs to which the disaster condition applies. The first list may be third identification information. Note that the first list may be a list of PLMNs that are not used in the PLMN selection at the time of the disaster roaming.

The second list may include one or more sets of PLMN IDs indicating PLMNs which support the disaster roaming and to which the disaster condition does not apply and information regarding signal loads (signaling overload) for the PLMN IDs or priority information for the PLMN IDs. The second list may be sixth identification information. The second list may be a list of PLMNs used for the PLMN selection at the time of the disaster roaming.

The signal load information may indicate whether or not the PLMNs are in the loaded state. Specifically, the signal load information may indicate whether or not the PLMNs are in the loaded state (whether or not the PLMNs are in a congested state) or may be a numerical value such as "a utilization rate: x %".

How high or low the priority is in the priority information may be indicated by how large or small the numerical value is. In other words, smaller numerical values may indicate higher priority or vice versa.

In a case that the PLMN ID included in the first list indicates the first PLMN, the UE need not detect that the first PLMN is under the disaster condition and perform disaster roaming to the first PLMN. Then, the UE may recognize a PLMN which supports the disaster roaming and to which the disaster condition does not apply, based on the PLMN ID included in the second list. Then, the UE may select a PLMN corresponding to the signal load information indicating that the PLMN is not in the load state or a PLMN corresponding to the priority information indicating the highest value of priority from the second list. In other words, the UE may not select any PLMN from the first list.

Note that the UE may select a PLMN indicated by a PLMN ID that is not indicated by the first list from the forbidden PLMN list instead of the above selection method in a case of selecting the PLMN. The UE may select a PLMN indicated by a PLMN ID indicated by the second list from the forbidden PLMN list instead of the above selection methods in a case of selecting the PLMN.

The second list may be configured in the form including one or more PLMN IDs indicating PLMNs which supports the disaster roaming, to which the disaster condition does not apply, and which is not in the loaded state. In a case that the network side determines whether or not the PLMN as the roaming destination is in the loaded state, for example, the second list may be configured in this manner. The UE may select the PLMN indicated by the PLMN ID included in the second list in a case of selecting the PLMN. In other words, the UE need not select any PLMN from the first list.

Note that the UE may select a PLMN indicated by a PLMN ID that is not indicated by the first list from the forbidden PLMN list instead of the above selection method in a case of selecting the PLMN. The UE may select a PLMN indicated by a PLMN ID indicated by the second list from the forbidden PLMN list instead of the above selection methods in a case of selecting the PLMN.

3.5. Fourth Embodiment

The fourth embodiment of the present invention is an embodiment related to processing in a case that the roaming is performed based on information received by the UE in a case that the disaster condition applies to the PLMN to which the UE is registered or connected and the network has notified the UE of the information including the fact that the disaster condition applies. In this procedure, the UE performs the roaming based on reception of various kinds of identification information and the SOR-CMCI.

Note that the present embodiment may be performed by a combination of one or more of the procedures or processing described in Chapter 3.1 and may be an embodiment in a case that the UE transmits the registration request message including the first identification information to the core network and the registration request message is accepted in the registration procedure described in Chapter 3.1.2, or in a case that the UE receives the accept message including the second identification information from the core network.

In the present embodiment, the timer included the third identification information and the SOR-CMCI received in advance or received along with the notification message is started in a case that the information indicating that the disaster condition applies (or no longer applies) to the PLMN to which the UE is registered or connected, that is, the third identification information included in the notification message is received, through the notification procedure described in Chapter 3.1.3, for example.

Note that in a case that the roaming is performed from the PLMN D to the PLMN A here, the timer value may be set to zero and the timer may be started regardless of the criteria included in the SOR-CMCI. In other words, the UE that receives the notification of the application of the disaster condition from the PLMN D may immediately perform de-registration procedure and perform roaming based on combinations of the PLMN IDs and the access technologies included in the SOR transparent container information element.

Also, in a case of receiving the fifth identification information in addition to the third identification information and/or the fourth identification information and/or the sixth identification information included in the notification message described in Chapter 3.1.3, for example, the UE may start the timer included in the SOR-CMCI based on the reception of the fifth identification information. Subsequently, the de-registration procedure may be performed based on expiration of the timer, and the procedure for registration in the PLMN indicated by the fifth identification information may be performed. In this case, the PLMN selection may or may not be performed, and determination may be performed based on the fifth identification information.

Note that the SOR-CMCI may be received via the AMF from the UDM of the HPLMN in a case that the UE is registered or connected to the HPLMN, or may be received from the VPLMN and/or the AMF inside the VPLMN from the UDM of the HPLMN in a case that the UE has been registered in or connected to the VPLMN.

4. Modifications

A program running on an apparatus according to the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such the functions of the embodiment according to the present invention may be recorded on a computer-readable recording medium. The functions may be realized by causing a computer system to read the program recorded on the recording medium and execute the program. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium dynamically holding the program for a short time, or any other computer readable recording medium.

Each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a known processor, a controller, a micro-controller, or a state machine. The aforementioned electric circuit may include a digital circuit or may include an analog circuit. In a case that, with advances in semiconductor technology, a circuit integration technology that replaces the present integrated circuits appears, one or multiple aspects of the present invention can also use a new integrated circuit based on the technology.

Note that, the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the similar effects, are substituted for one another is also included.

The invention claimed is:

1. A User Equipment (UE) comprising:
transmission and reception circuitry; and
a controller, wherein
the transmission and reception circuitry:
    receives first control information containing one or more Public Land Mobile Network Identifications (PLMN IDs) usable in a disaster condition, and
    receives second control information containing a PLMN ID with a disaster condition, and
the controller selects a PLMN in the first control information based on the first control information and the second control information during disaster roaming.

2. A communication control method performed by a User Equipment (UE), the communication control method comprising:
    receiving first control information containing one or more Public Land Mobile Network Identifications (PLMN IDs) usable in a disaster condition;
    receiving second control information containing a PLMN ID with a disaster condition; and
    selecting a PLMN in the first control information based on the first control information and the second control information during disaster roaming.

* * * * *